(12) United States Patent
Brinkman et al.

(10) Patent No.: US 10,746,978 B2
(45) Date of Patent: Aug. 18, 2020

(54) OPTICAL SYSTEM, IMMERSION LIQUID HOLDER AND OBSERVATION DEVICE

(71) Applicant: OLYMPUS CORPORATION, Hachioji-shi, Tokyo (JP)

(72) Inventors: Brendan Brinkman, Hopkinton, MA (US); Yoshihiro Shimada, Sagamihara (JP); Daisuke Nishiwaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 146 days.

(21) Appl. No.: 15/872,149

(22) Filed: Jan. 16, 2018

(65) Prior Publication Data

US 2018/0259761 A1 Sep. 13, 2018

(30) Foreign Application Priority Data

Mar. 7, 2017 (JP) .................................. 2017-042276

(51) Int. Cl.
*G02B 21/33* (2006.01)
*G02B 21/24* (2006.01)
*G01N 21/64* (2006.01)

(52) U.S. Cl.
CPC ......... *G02B 21/33* (2013.01); *G01N 21/6458* (2013.01); *G01N 2021/6463* (2013.01); *G02B 21/241* (2013.01)

(58) Field of Classification Search
None
See application file for complete search history.

(56) References Cited

U.S. PATENT DOCUMENTS

| | | | |
|---|---|---|---|
| 5,870,223 A | 2/1999 | Tomimatsu | |
| 9,239,524 B2 * | 1/2016 | Kida | .................... G03F 7/70341 |
| 2003/0022105 A1 * | 1/2003 | Prasad | .................. A61K 41/008 |
| | | | 430/270.15 |
| 2014/0063599 A1 * | 3/2014 | Nakasho | ................. G01N 21/01 |
| | | | 359/391 |
| 2015/0241682 A1 | 8/2015 | Kues et al. | |

FOREIGN PATENT DOCUMENTS

| | | | | |
|---|---|---|---|---|
| EP | 0712011 A1 * | 5/1996 | ........... | G01N 21/253 |
| JP | 10039220 A | 2/1998 | | |

* cited by examiner

*Primary Examiner* — Derek S. Chapel
(74) *Attorney, Agent, or Firm* — Holtz, Holtz & Volek PC

(57) ABSTRACT

An immersion liquid holder 2 is an immersion liquid holder that is used for an observation device 10 for observing sample S by using an immersion method, and includes a supporting member 2b configured to support an absorption member 3 that has absorbed an immersion liquid and a connection unit 2c configured to relatively fix the absorption member 3 that has absorbed the immersion liquid with respect to an optical system, which is an optical system included in the observation device 10, and to fix the absorption member 3 on an optical path of the optical system 1, by fixing the supporting member 2b to the observation device 10.

12 Claims, 24 Drawing Sheets

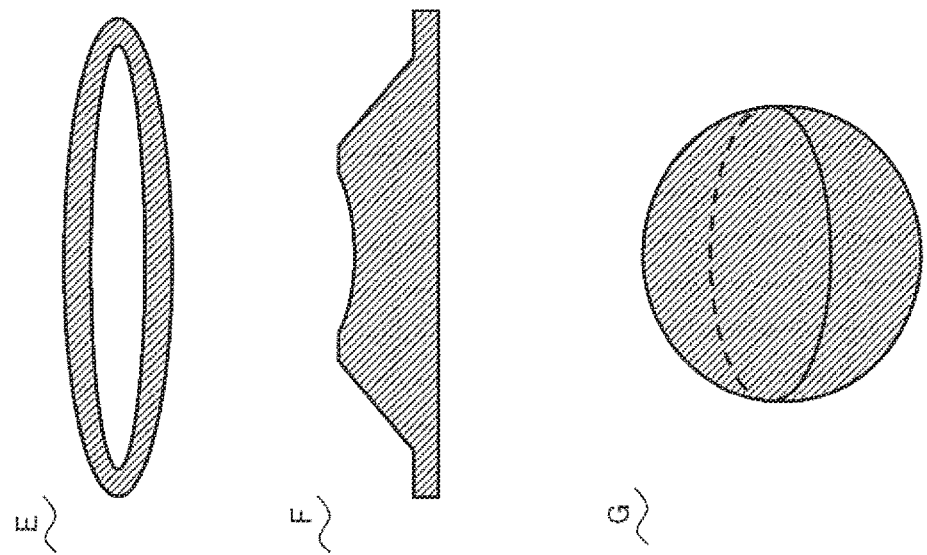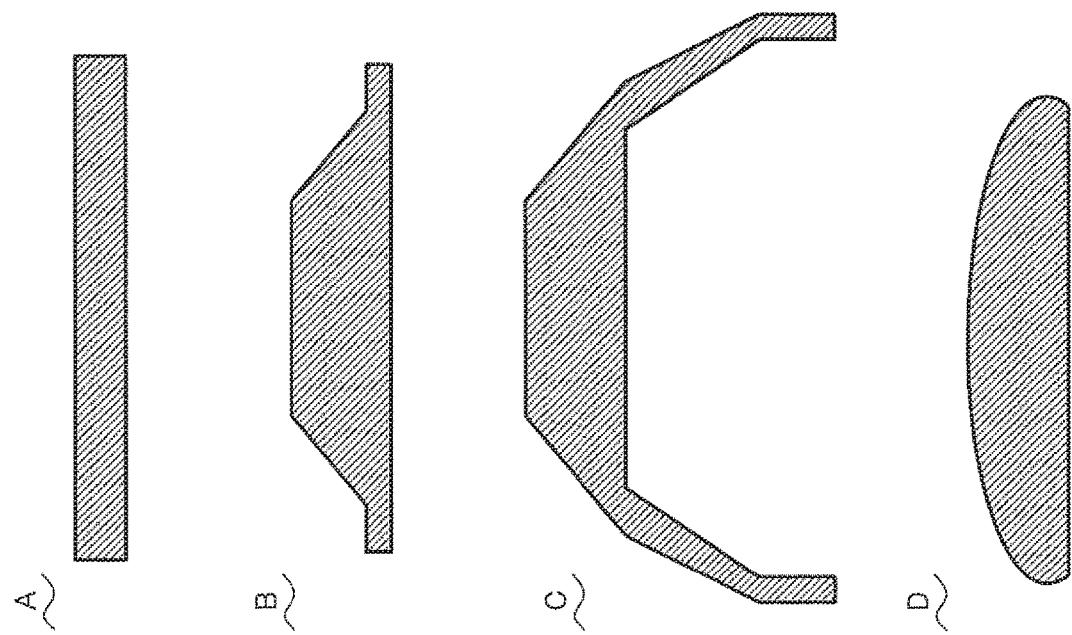
FIG. 24

OPTICAL SYSTEM, IMMERSION LIQUID HOLDER AND OBSERVATION DEVICE

CROSS REFERENCE TO RELATED APPLICATIONS

This application is based upon and claims the benefit of priority from prior Japanese Patent Application No. 2017-042276, filed Mar. 7, 2017, the entire contents of which are incorporated herein by this reference.

BACKGROUND OF THE INVENTION

Field of the Invention

The present invention is related to an observation method in which a sample is observed by using an immersion method, an immersion liquid holder that holds an immersion liquid, and an observation device for observing a sample by using an immersion method.

Description of the Related Art

An immersion method has conventionally been known that increases a numerical aperture by filling the space between the optical system and the sample with a liquid (immersion liquid). As an immersion liquid, water, oil, etc. are used, and an immersion objective that is in accordance with an immersion liquid to be used is used.

Techniques for adding a structure for holding immersion liquid onto a lens while preventing the immersion liquid from spilling when an observation is conducted using an immersion method are known.

There is also a technique of arranging an elastomer instead of an immersion liquid as described in US Patent Application Publication No. 2015/241682.

SUMMARY OF THE INVENTION

An optical system according to an aspect of the present invention is an optical system that detects light coming from a sample by using an immersion method, the optical system including an absorption member that has absorbed an immersion liquid, wherein the light coming from the sample after traveling through the absorption member that has absorbed the immersion liquid is guided to a light detection unit.

An optical system according to another aspect of the present invention is an optical system that provides illumination on a sample by using an immersion method, the optical system including an absorption member that has absorbed an immersion liquid, wherein the illumination light is issued to the sample via the absorption member that has absorbed the immersion liquid.

An immersion liquid holder according to an aspect of the present invention is an immersion liquid holder that is used for an observation device for observing a sample by using an immersion method, the immersion liquid holder including a supporting member configured to support an absorption member that has absorbed an immersion liquid, and a connection unit configured to relatively fix the absorption member that has absorbed the immersion liquid with respect to an optical system included in the observation device and to fix the absorption member on an optical path of the optical system, by fixing the supporting member to the observation device.

An observation device according to an aspect of the present invention is an observation device that is for observing a sample by using an immersion liquid, and includes an optical system and an immersion liquid container according to the above aspect.

BRIEF DESCRIPTION OF THE DRAWINGS

The present invention will be more apparent from the following detailed description when the accompanying drawings are referenced.

FIG. 24 illustrates examples of shapes that can be employed by an absorption member that has absorbed an immersion liquid.

DESCRIPTION OF THE EMBODIMENTS

The types of immersion liquids that are appropriate for observations vary depending upon the refractive indexes of samples and media. For example, when using a particular immersion objective in an observation, observing a sample having a refractive index different from that of the immersion liquid in use results in the occurrence of a spherical aberration according to the objective depth. Even in a case where an elastomer is used, as in US Patent Application Publication No. 2015/241682, similar problems may occur for some types of samples that are to be observed. While in some cases a correction collar is provided in the lens, it requires depth adjustments for each observation depth, which is troublesome.

Also, it is important for immersion liquids, because of their liquidity, to prevent leakage, evaporation, etc. to the outside in order to continuously maintain the volume. Meanwhile, in some cases it is difficult to maintain a necessary volume of liquid, including for example, among others, a case when a lens with a long operation distance is used for an inverted microscope. There is a demand for an observation technique that makes it possible to maintain an immersion liquid satisfactorily even in such a case.

In view of the above, it is an object of the present invention to provide an observation technique that uses an immersion method and that makes it possible to maintain an immersion liquid satisfactorily and to permit an observation easily in accordance with the types of samples and observation depths.

Figure 1:
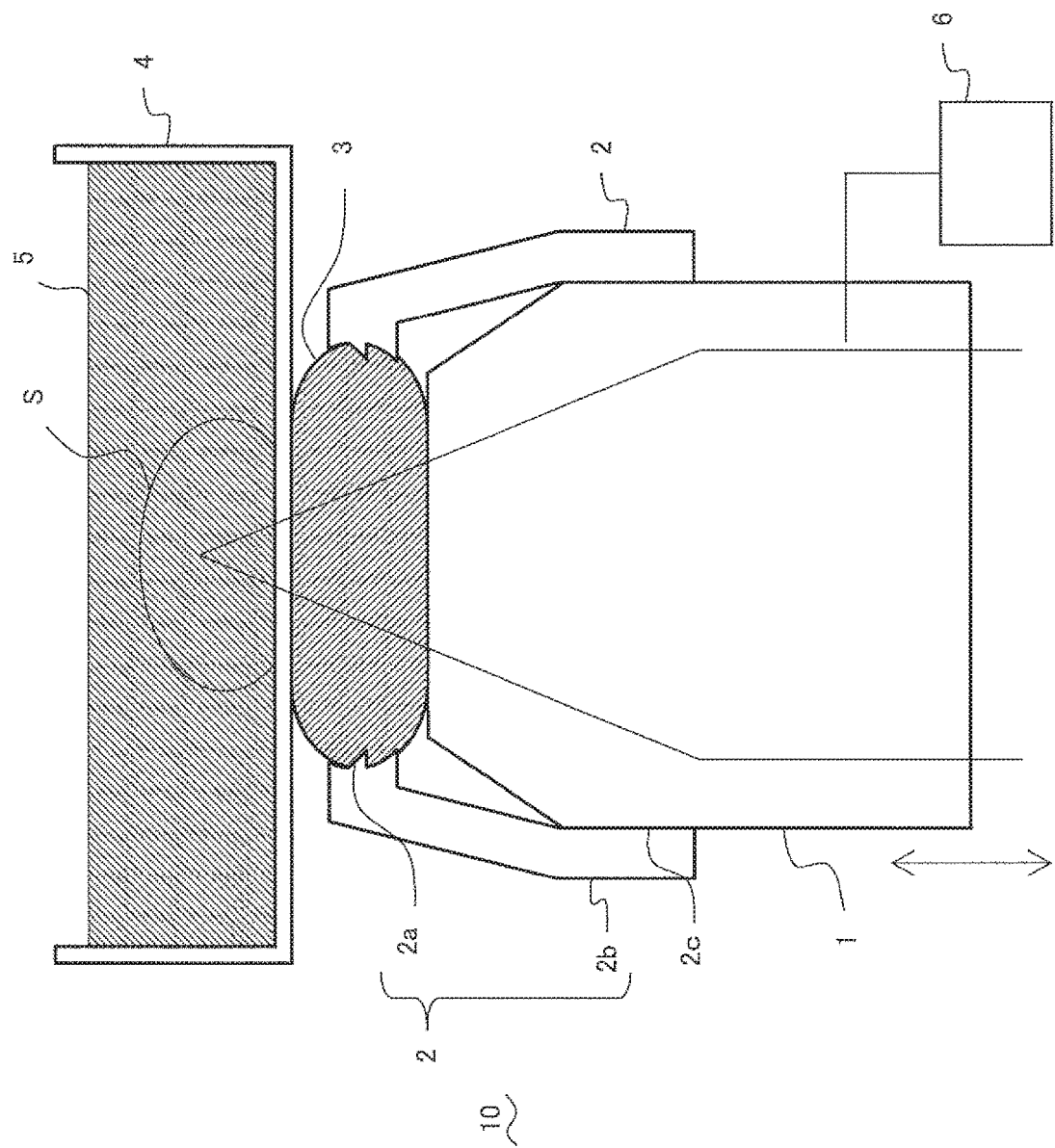
FIG. 1 illustrates part of a configuration of an observation device according to the first embodiment.

Hereinafter, explanations will be given for an observation device and an observation method using that observation device in the first embodiment of the present invention. FIG. 1 illustrates part of a configuration of an observation device 10, according to the present embodiment, for observing a sample by using an immersion method.

The observation device 10 is an epi-illumination inverted microscope which observes sample S from below when set on a horizontal plane. The observation device 10 includes a detection optical system 1, immersion liquid holders 2, and an absorption member 3. Note that sample S is contained in a sample container 4 together with a culture fluid 5. The sample container 4 may contain, instead of the culture fluid 5, a transparentization liquid, other immersion media, etc., that are known to be for suppressing the scattering of fluorescence.

The detection optical system 1 is an optical system that issues illumination light to sample S and detects fluorescence occurring from sample S. While the detection optical system 1 is an objective in FIG. 1, it may be configured by using a plurality of other optical systems. The observation device 10 has a light source and a light detection unit (not illustrated), and the detection optical system 1 is configured to issue the illumination light from the light source to sample S and to guide the fluorescence from sample S to the light detection unit. The light detection unit is for example an image pickup device such as a camera or an optical detector. Also, the observation device 10 may be a binocular stereo microscope, which forms images on the pupils of the observer via the detection optical system 1 by treating the pupils as a light detection unit.

Also, the detection optical system 1 may have a driving mechanism 6 that is a focus adjustment mechanism, and the position of the focal point is changed by the driving mechanism 6 changing the operation distance of the detection optical system 1. The driving mechanism 6 is for example a motor that drives a lens that is a constituent of the detection optical system 1.

As the absorption member 3, a member that can absorb a liquid and remain in a state in which it has absorbed the liquid is used. The absorption member 3 is for example a superabsorbent polymer (SAP). The absorption member 3 absorbs an arbitrary immersion liquid that is used for observations. An immersion liquid used for the observation is of a type that has conventionally been used for an immersion objective lens, such as water, oil, etc., and is, particularly, in accordance with the refractive index of the culture fluid 5 (or transparentization liquid etc.) contained by the sample container 4. Also, a substance that serves as an elastic body when absorbing liquid is used as the absorption member 3.

The immersion liquid holders 2 fix, with respect to the observation device 10, the absorption member 3 that has absorbed an immersion liquid, and thereby fixes the absorption member 3 with respect to the detection optical system 1. In the present embodiment, the immersion liquid holders 2 include supporting members 2b that have shapes 2a, and connection units 2c.

The supporting members 2b have a projecting shape similar to the shapes 2a. The supporting members 2b support the absorption member 3 with the shapes 2a biting into the absorption member 3 and sandwiching it in two directions, the absorption member 3 having become an elastic body by absorbing liquid.

The connection units 2c fix the supporting members 2a to the observation device 10, and thereby relatively fix the absorption member 3 that has absorbed the immersion liquid with respect to the detection optical system 1, which is an optical system included in the observation device 10. In the present embodiment, the connection units 2c are configured to directly fix the supporting members 2a with respect to the detection optical system 1 with a screw or the like. Also, the absorption member 3 is arranged on the optical path of the detection optical system 1 when the absorption member 3 is fixed with respect to the detection optical system 1 by the connection unit 2c. In other words, the illumination light from the detection optical system 1 and the light coming from sample S to enter the detection optical system 1 travel through the absorption member 3 that is held by the immersion liquid holders 2.

Note that any configuration may be employed for the supporting member 2b as long as it can support the absorption member 3, and a configuration that presses on the absorption member 3 that has absorbed an immersion liquid against the detection optical system 1 and thereby supports the absorption member 3 may also be employed. Also, the supporting member 2b is not limited to a configuration of sandwiching the absorption member 3 in two directions, and may support the absorption member 3 from the circumference of the absorption member 3.

Also, because the supporting members 2b are arranged outside the optical path of the detection optical system 1, it does not block light traveling through the detection optical system 1. It is more desirable that the supporting members 2b be arranged outside the effective diameter of the detection optical system 1.

It is also desirable that the absorption member 3 project beyond the supporting members 2b toward sample S when the supporting members 2b are supporting the absorption member 3 that has absorbed an immersion liquid. This is to prevent the immersion liquid holders 2 (supporting members 2b) and the sample container 4 from being brought into contact with each other and damaging the device or the container.

Figure 2:
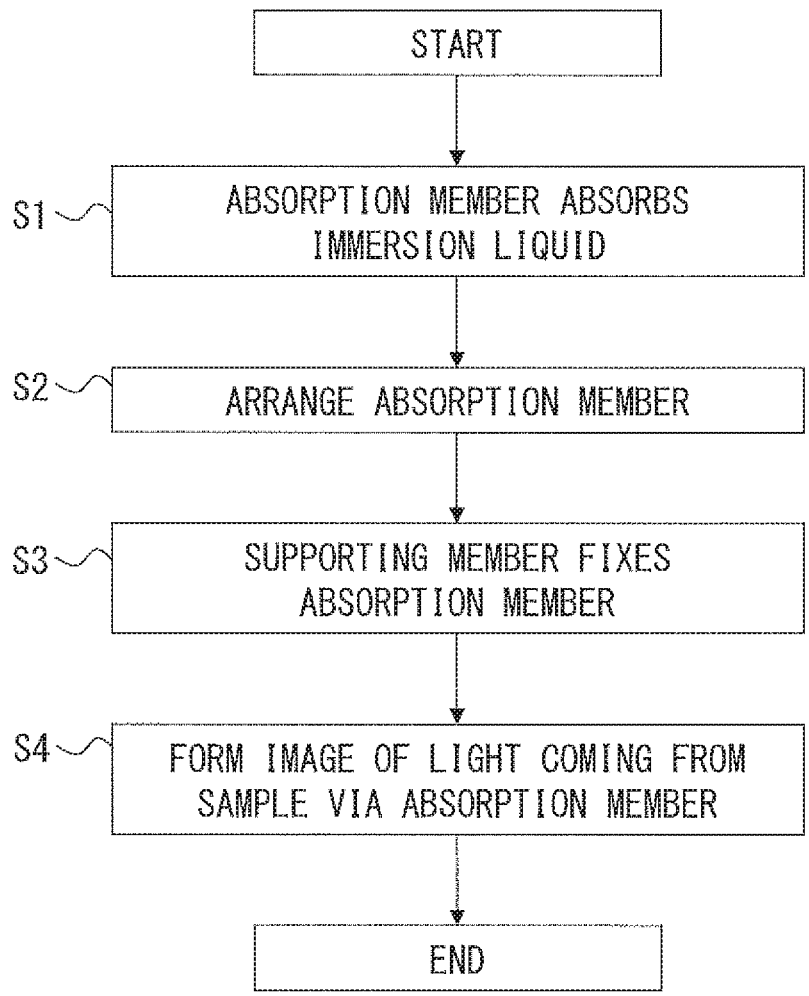
FIG. 2 is a flowchart illustrating procedures of a method of observing a sample by using the observation device, according to the first embodiment, that uses an immersion method.

In the observation device 10 having the above configuration, sample S in the sample container 4 is observed with the absorption member 3 fixed by the immersion liquid holders 2. FIG. 2 is a flowchart illustrating procedures of a method of observing sample S by using the observation device 10, illustrated in FIG. 1, that uses an immersion method. Hereinafter, by using FIG. 2, explanations will be given for a method of an observation using the observation device 10.

In step S1, the absorption member 3 absorbs an immersion liquid.

In step S2, the absorption member 3 that has absorbed the immersion liquid is arranged between the detection optical system 1 and sample S. In this example, it is arranged in the upper portion of the detection optical system 1.

In step S3, the immersion liquid holders 2 sandwich the absorption member 3 that has absorbed the immersion liquid in two directions by using the supporting members 2b so as to fix it.

In step S4, the detection optical system 1 issues illumination light to sample S via the absorption member 3, the sample container 4 and the culture fluid 5, and guides, to the light detection unit, the fluorescence coming from sample S through the culture fluid 5, the sample container 4 and the absorption member 3.

The observation method using the above observation device 10 makes it possible to prevent an immersion liquid from leaking outside the detection optical system 1 because the absorption member 3 arranged between sample S and the detection optical system 1 absorbs an immersion liquid and remains in that state. Also, because the absorption member 3 that has absorbed an immersion liquid is an elastic body, even when the relative distance between the detection optical system 1 and the sample container 4 is changed and it is pressed between the detection optical system 1 and the sample container 4, the shape changes without restriction. This makes it possible to respond to a case where the operation distance of the detection optical system 1 changes in a state in which a different objective is used and the absorption member 3 is arranged by the above driving mechanism 6.

Also, fixing the absorption member 3 that has absorbed an immersion liquid to the immersion liquid holders 2 makes it possible to hold the immersion liquid satisfactorily. In particular, it is possible to easily fix the absorption member 3 by sandwiching the absorption member 3 from both sides by using the supporting members 2b of the immersion liquid holders 2 because the absorption member 3 that has absorbed an immersion liquid is an elastic body.

As described above, an observation method using the observation device 10 makes it possible to satisfactorily hold an immersion liquid, for which there has conventionally been a risk of leakage to the outside as a liquid.

Also, the types of an immersion liquid to be absorbed by the absorption member 3 are not limited. This makes it possible to select a type of an immersion liquid, to be absorbed by the absorption member 3, that has a refractive index not different from those of sample S as an observation target and of culture fluid 5. Generally, when the optical system of an observation device has a refractive index different from those of sample S and the immersion liquid, a spherical aberration that varies as the observation depth of sample S changes may occur. An observation method using the observation device 10 of the present embodiment makes it possible to easily conduct an observation in which the occurrence of a spherical aberration is prevented by making the absorption member 3 absorb an appropriate immersion liquid, saving the trouble of performing aberration corrections in accordance with observation depths by using a correction collar etc.

Further, it is also possible to select and use the absorption member 3 that is of a high absorption rate in accordance with the immersion liquid that is to be used. Also, the absorption member 3 may be of a disposable type, and can be replaced with a different absorption member.

As described above, the present invention makes it possible to hold an immersion liquid satisfactorily and to easily conduct an observation in accordance with the types of samples and with observation depths.

Figure 3:
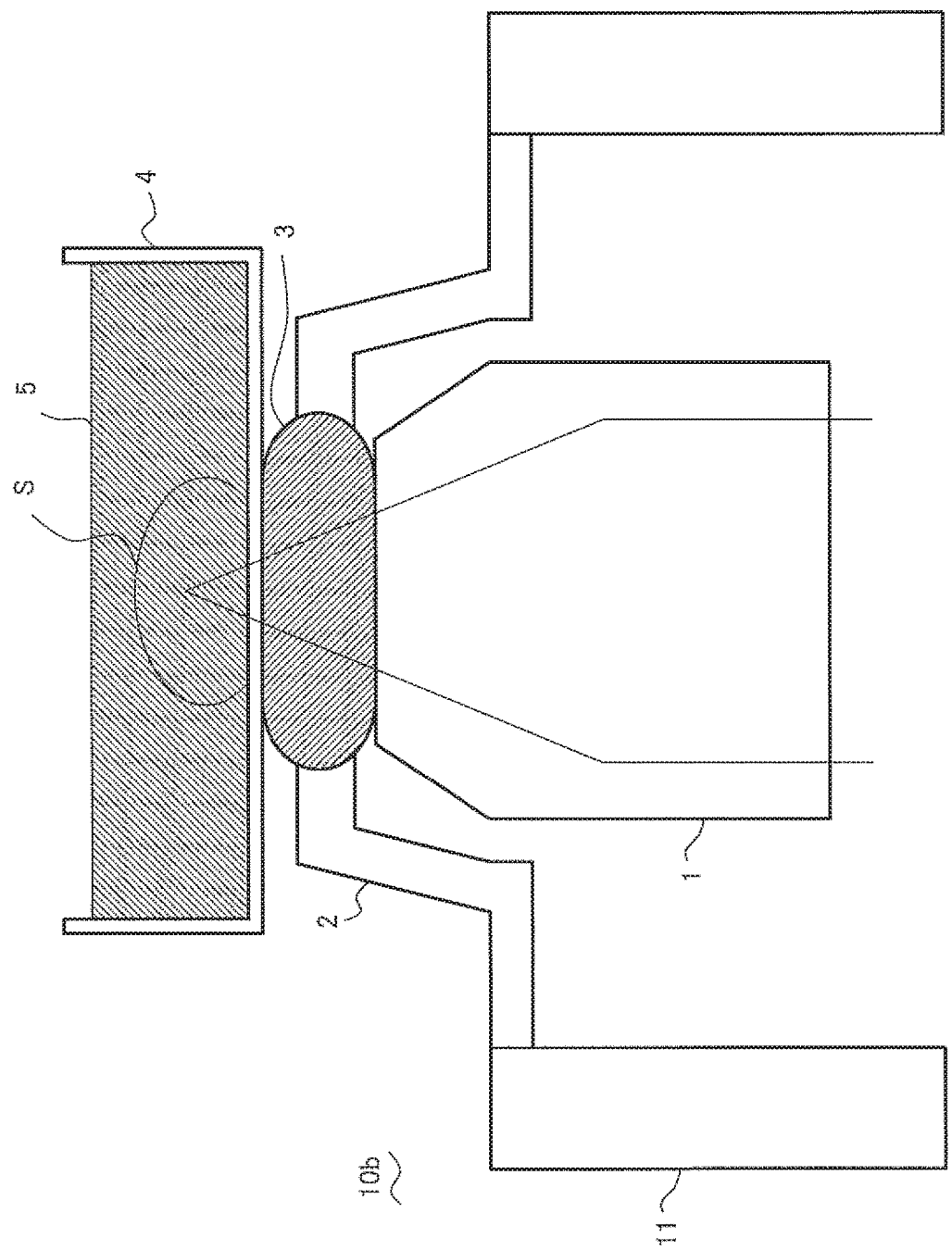
FIG. 3 illustrates part of a configuration of an observation device that is a variation example of the observation device according to the first embodiment.

FIG. 3 illustrates part of a configuration of an observation device 10b, which is a variation example of the observation device 10 of the first embodiment. In the present variation example, the immersion liquid holders 2 are fixed to a microscope body 11 instead of the detection optical system 1. As described above, the immersion liquid holders 2 may be directly fixed to the observation device body.

Figure 4:
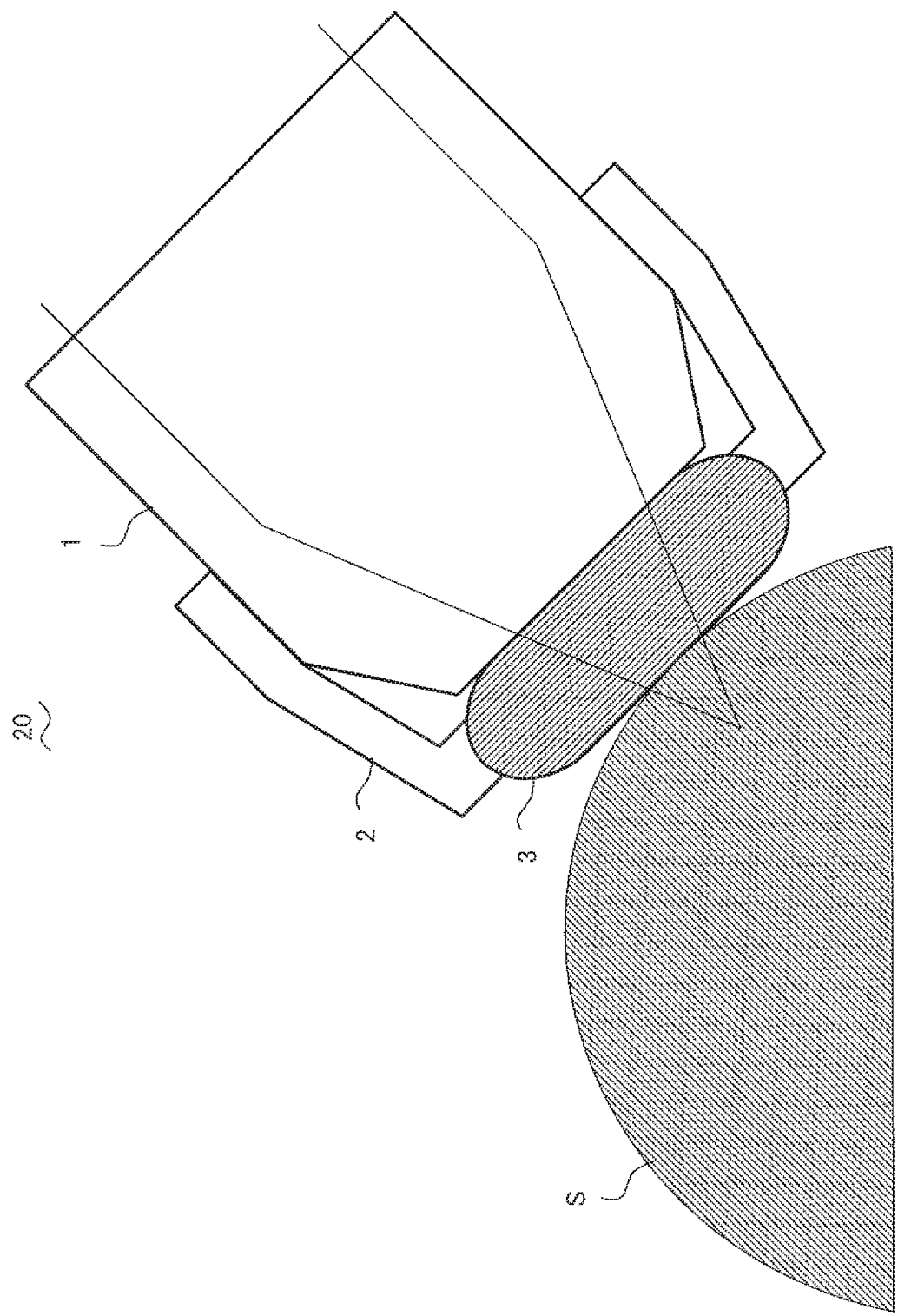
FIG. 4 illustrates part of a configuration of an observation device according to the second embodiment.

FIG. 4 illustrates part of a configuration of an observation device 20 according to the second embodiment. While the observation device 20 is different from the observation device 10 in that it is an epi-illumination upright microscope, it is similar to the observation device 10 in view of the respective constituents.

Note that in the example of FIG. 4, the observation device 20 directly observes sample S, which is an observation target, without going through a container. The absorption member 3 is arranged between sample S and the detection optical system 1 so as to be fixed by the immersion liquid holders 2. Note that the immersion liquid holders 2 are similar to those explained in the first embodiment, and sandwich and fix the absorption member 3 by using the shapes 2a of the supporting members 2b when fixing the absorption member 3.

As described above, also in the observation device 20, which is an upright microscope of the present embodiment, sample S can be observed by using a method similar to that of the first embodiment.

Figure 5:
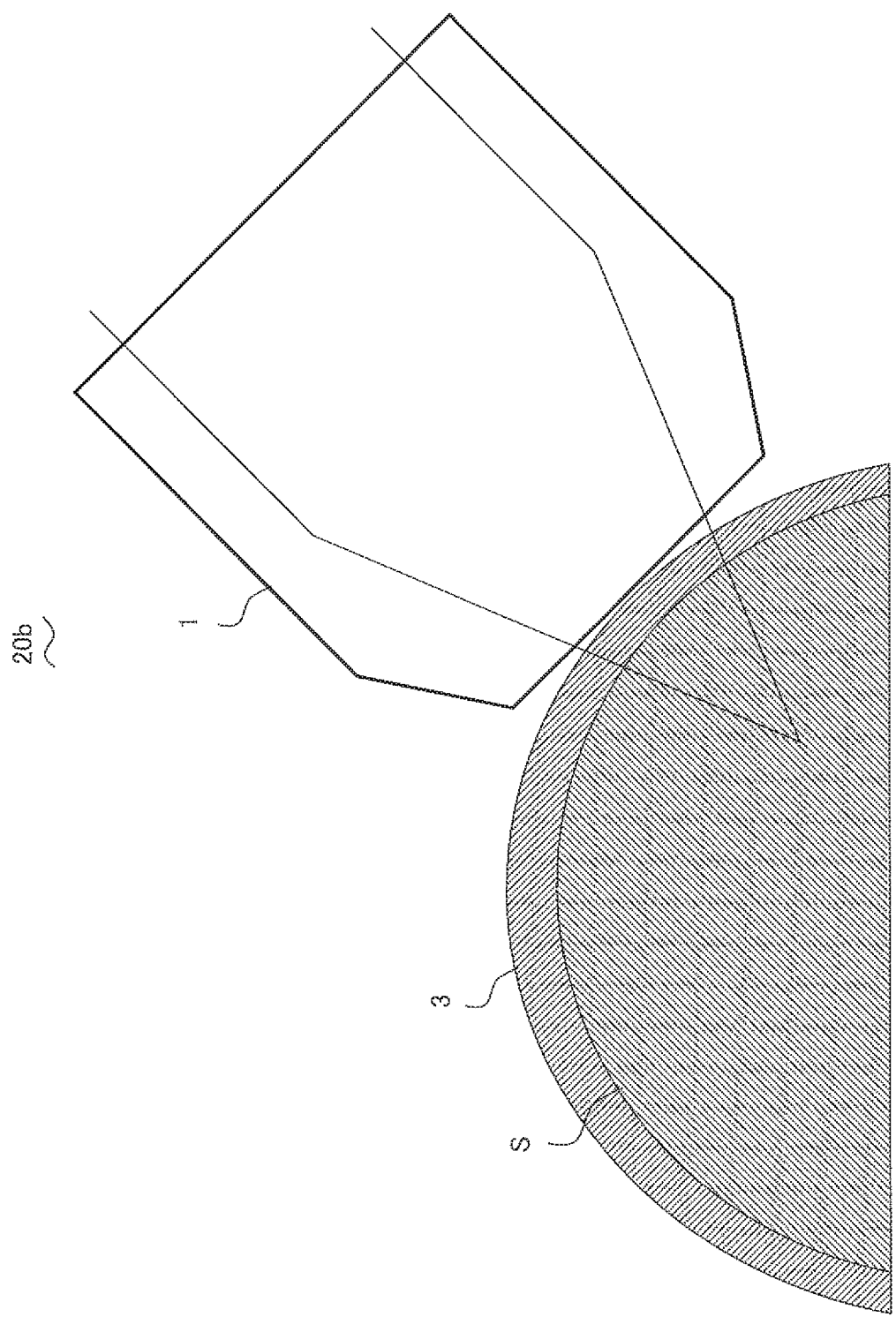
FIG. 5 illustrates part of a configuration of an observation device that is a variation example of the observation device according to the second embodiment.

FIG. 5 illustrates part of a configuration of an observation device 20b, which is a variation example of the observation device 20 according to the second embodiment. The observation device 20b of the present embodiment is different from the observation device 20 in that it does not have the immersion liquid holders 2 as its constituents. Also, the observation device 20b is different in that it has the absorption member 3 that has absorbed an immersion liquid arranged to cover sample S, whereas the observation device 20b is similar in that it has the absorption member 3 arranged between sample S and the detection optical system 1.

Figure 6:
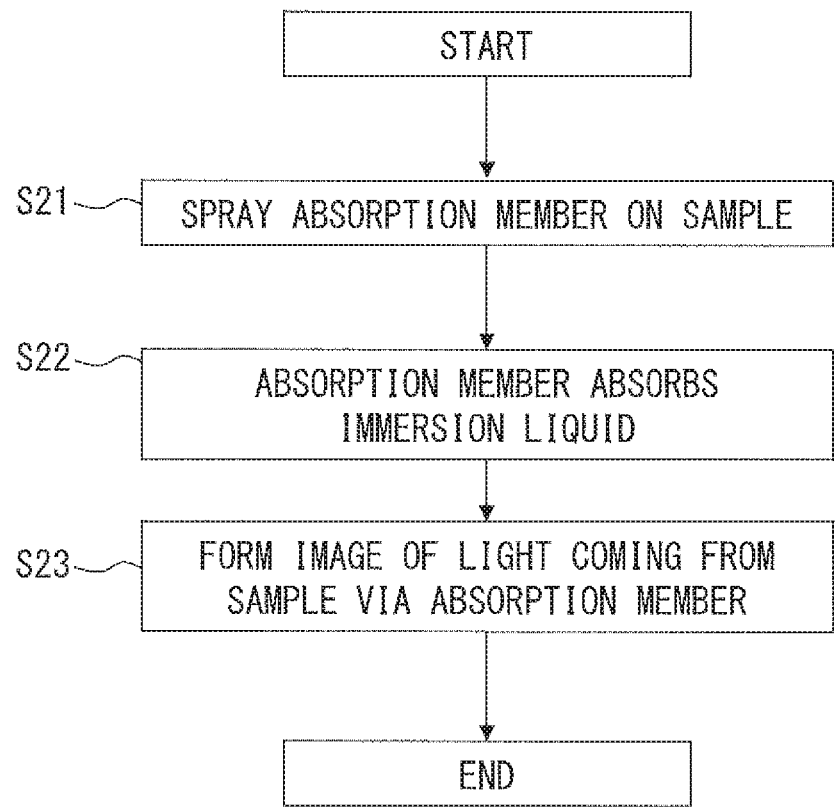
FIG. 6 is a flowchart illustrating procedures of a method of observing a sample by using the observation device, according to a variation example of the second embodiment, that uses an immersion method.

FIG. 6 is a flowchart illustrating procedures of a method of observing sample S by using the observation device 20b, illustrated in FIG. 5, that uses an immersion method.

Next, explanations are hereinbelow given for a method of an observation that uses the observation device 20b, by referring to FIG. 6. In the method illustrated in FIG. 6, the absorption member 3 is arranged in such a manner that the absorption member 3 is brought into contact with sample S in advance so that the absorption member 3 absorbs an immersion liquid so as to surround sample S.

In step S21, the absorption member 3 that has been formed in accordance with the sample in advance is brought into contact with sample S. In step S22, the absorption member 3 that has been sprayed on sample S is made to absorb the immersion liquid. Through Step S21 and step S22, the situation becomes identical to the situation after step S13 of FIG. 6 has been completed (situation illustrated in FIG. 5). Step S23 is similar to step S14.

Thus, the observation method, illustrated in FIG. 6, that uses the observation device 20b above can also hold an immersion liquid satisfactorily without the problem of the immersion liquid leaking out. Further, by selecting a type of an immersion liquid that is to be absorbed by the absorption member 3, an observation can easily be conducted in accordance with the types of samples and observation depths.

In particular, the observation device 20b does not have the immersion liquid holders 2 as constituents, eliminating the necessity of preparing the immersion liquid holders 2 in accordance with the size of the objective (the detection optical system 1) for observations. This leads to an advantage wherein it is easier to switch, in an observation, between different objectives (the detection optical systems 1) for an identical sample S than in the first and second embodiments.

Figure 7:
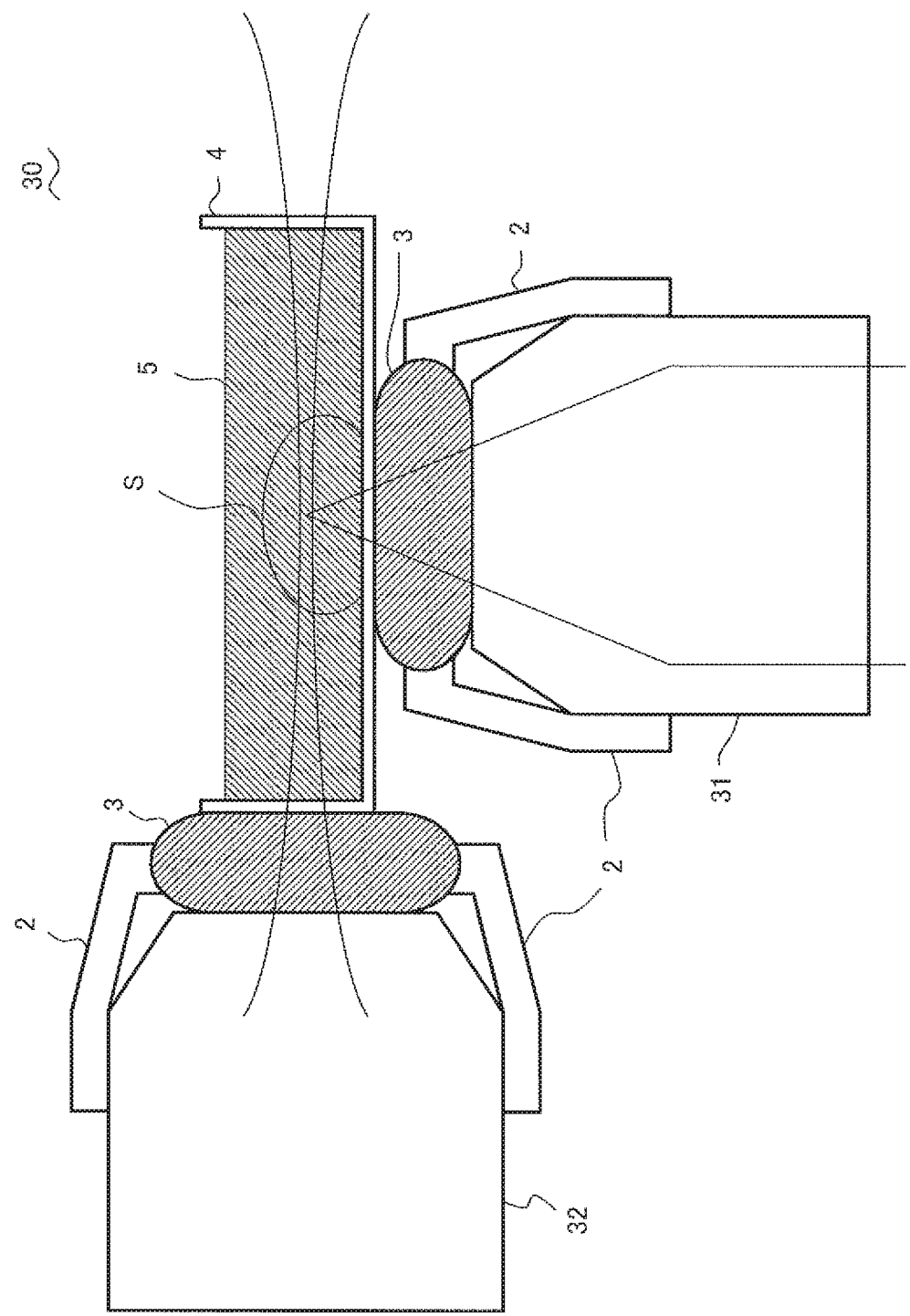
FIG. 7 illustrates part of a configuration of an observation device according to the third embodiment.

FIG. 7 illustrates part of a configuration of an observation device 30 according to the third embodiment. The observation device 30 is a microscope for sheet illumination, and includes an illumination optical system 32 that is arranged to have its optical axis orthogonal to the optical axis of a detection optical system 31. In the observation device 30, the immersion liquid holders 2 are connected to both the detection optical system 31 and the illumination optical system 32, and the absorption member 3 that has absorbed an immersion liquid is fixed by the immersion liquid holders 2. In this example, the configuration of the immersion liquid holder 2 connected to each of the illumination optical system 32 and the detection optical system 31 and the method of fixing the absorption member 3 by using the immersion liquid holders 2 are identical to those for the observation device 10 in the first embodiment.

Figure 8:
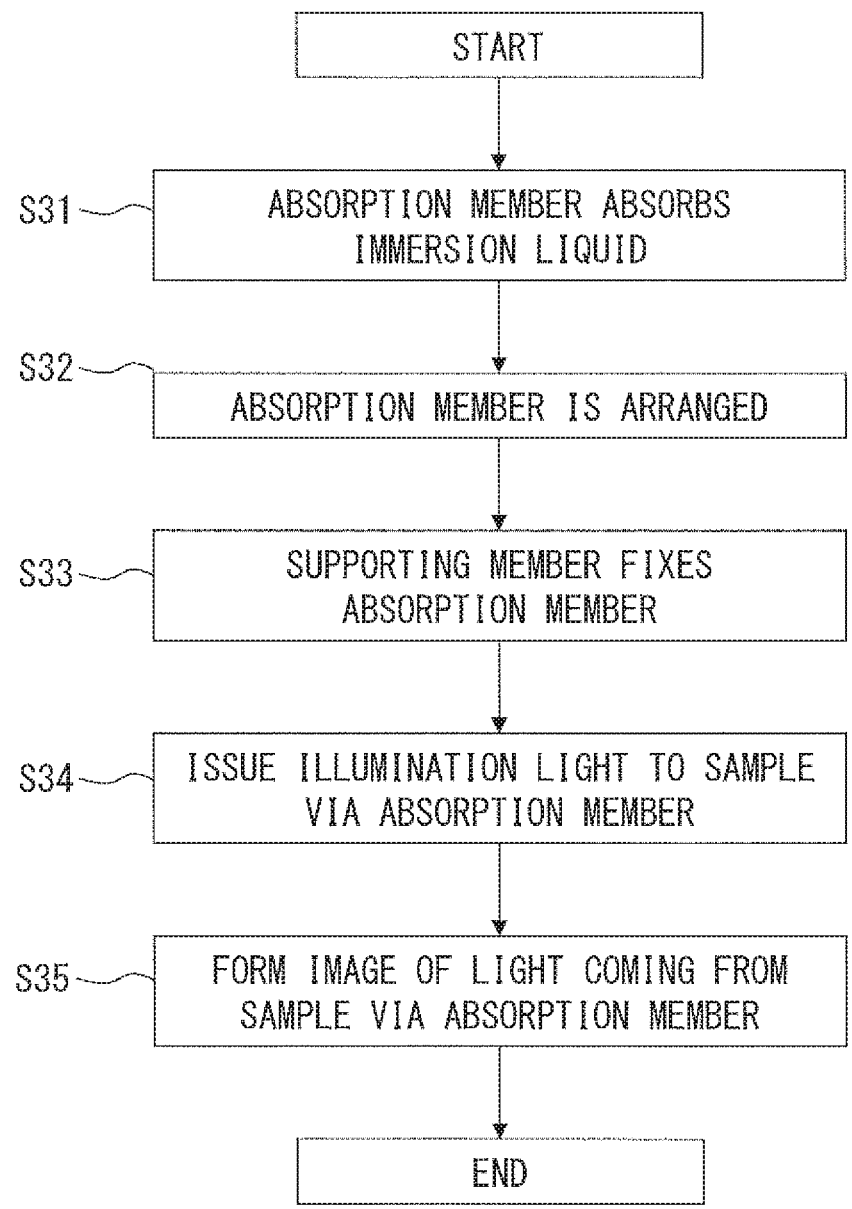
FIG. 8 is a flowchart illustrating procedures of a method of observing a sample by using the observation device, according to the third embodiment, that uses an immersion method.

FIG. 8 is a flowchart illustrating procedures of a method of observing sample S by using the observation device 30, illustrated in FIG. 7, that uses an immersion method. Hereinafter, by referring to FIG. 8, explanations will be given for an observation that uses the observation device 30.

Step S31 is similar to step S1 of FIG. 2 in the first embodiment. In this example, the detection optical system 31 makes the two absorption members 3 absorb an immersion liquid so that they are arranged for the detection optical system 31 and the illumination optical system 32.

In step S32, the two absorption members 3 that have absorbed the immersion liquid in step S31 are respectively arranged between the detection optical system 31 and sample S and between the illumination optical system 32 and sample S. In step S33, the respective absorption members 3 are fixed by the immersion liquid holders 2 that are respectively connected to the detection optical system 31 and the illumination optical system 32.

In step S34, the illumination optical system 32 issues illumination light to sample S via the absorption member 3, the sample container 4, and the culture fluid 5 while the detection optical system 31 guides, to the light detection unit, fluorescence coming from sample S after traveling through the culture fluid 5, the sample container 4 and the absorption member 3.

Therefore, according to the observation method, illustrated in FIG. 8, that uses the above observation device 30, an immersion liquid can be held satisfactorily without the problem wherein the immersion liquid leaks out, even in a microscope for sheet illumination. Further, by selecting a type of an immersion liquid that is to be absorbed by the absorption members 3, an observation can easily be conducted in accordance with the types of samples and observation depths.

Figure 9:
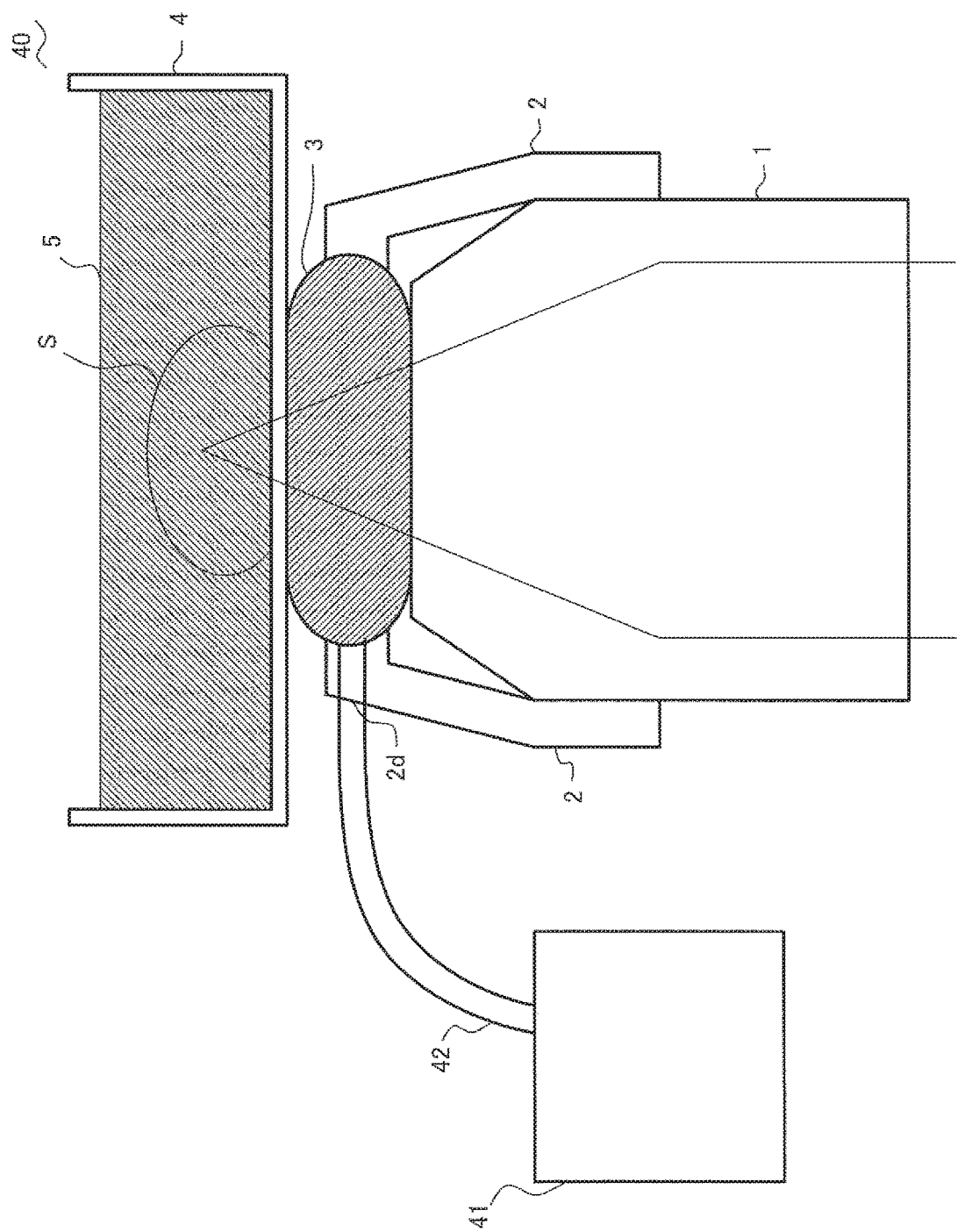
FIG. 9 illustrates part of a configuration of an observation device according to the fourth embodiment.

FIG. 9 illustrates part of a configuration of an observation device 40 according to the fourth embodiment. The observation device 40 includes an immersion liquid supplying mechanism 41, and is similar to the observation device 10 of the first embodiment for the other configuration.

An immersion liquid supplying mechanism 41 is a device that additionally supplies an immersion liquid from the outside to the absorption member 3 that has absorbed an immersion liquid. The immersion liquid supplying mechanism 41 has a pipe 42, and supplies an immersion liquid to the absorption member 3 via the pipe 42. The pipe 42 has flexibility, and can bend in various directions.

Note that while the immersion liquid supplying mechanism 41 may supply an immersion liquid to the absorption member 3 via the pipe 42, it may employ a configuration with an immersion liquid holder 2 having an opening 2d for passing the pipe 42 as illustrated in FIG. 9 so that an immersion liquid can be supplied to the absorption member 3 with the pipe 42 passing through the opening 2d.

As described above, according to the observation device 40 of the present embodiment, the immersion liquid supplying mechanism 41 and the pipe 42 continuously supply additional immersion liquid to the absorption member 3. This makes it possible to observe sample S for a long period of time even when the evaporation of the immersion liquid from the absorption member 3 is taken into consideration.

Figure 10:
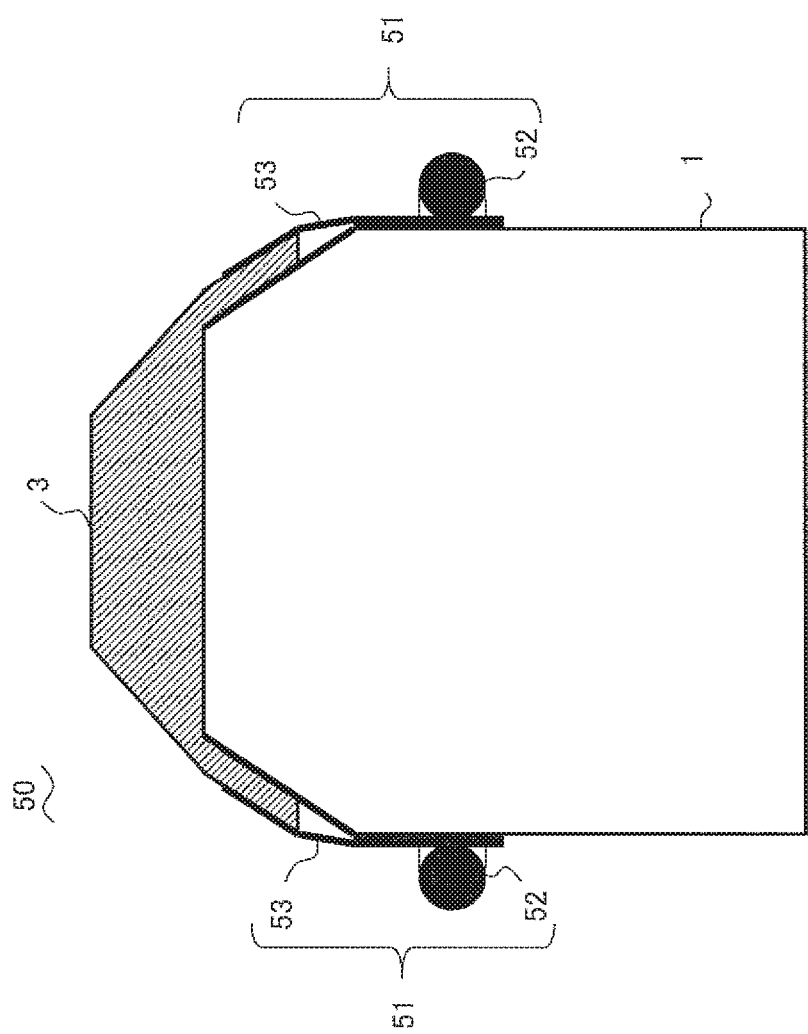
FIG. 10 illustrates part of a configuration of an observation device according to the fifth embodiment.

FIG. 10 illustrates part of a configuration of an observation device 50 according to the fifth embodiment. The observation device 50 is different from the observation device 10 in that it includes immersion liquid holders 51 instead of the immersion liquid holders 2.

The immersion liquid holders 51 include a connection unit 52 and supporting members 53. The connection unit 52 is of an elastic material, such as an O-ring or the like, and connects and fixes the supporting members 53 to the detection optical system 1. Specifically, the connection unit 52, which is an O-ring, presses the supporting members 53 from outside against the detection optical system 1 so as to fix them.

The supporting members 53 support the absorption member 3 that has absorbed an immersion liquid by sandwiching it, as illustrated in FIG. 10. The absorption member 3 is arranged at a similar position to that in the first embodiment. For the supporting members 53, for example an elastic and flexible film made of a plastic material is used.

While FIG. 10 illustrates a configuration in which the immersion liquid holders 51 sandwich the absorption member 3 from both sides by using films, the scope of the present invention is not limited to this and the absorption member 3 may be fixed to the detection optical system 1 by being surrounded by the films. For example, part of the absorption member 3 is sandwiched between the films and the detection optical system 1 so that the detection optical system 1 is wrapped with the supporting members 53, which are films. Then, the absorption member 3 may be fixed by making the connection unit 52 press the supporting members 53 against the detection optical system 1.

Figure 11:
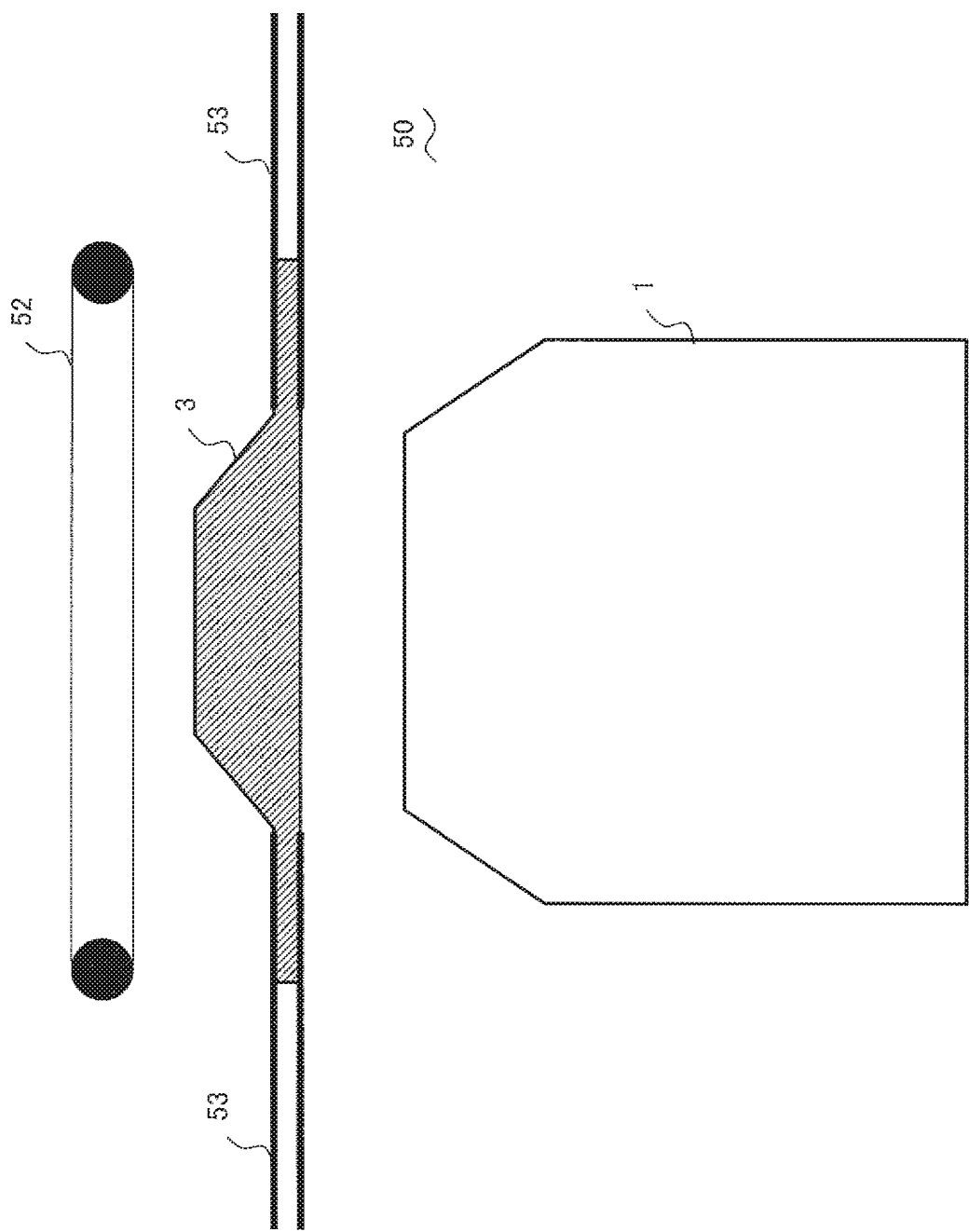
FIG. 11 illustrates a situation before immersion liquid holders are connected to a detection optical system.
Figure 12:
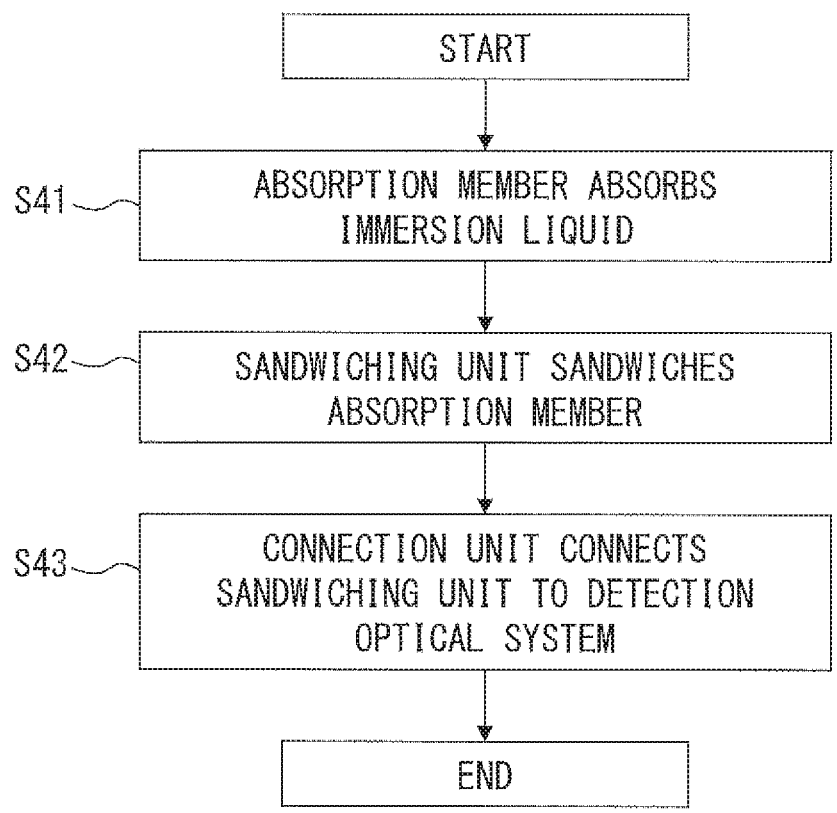
FIG. 12 is a flowchart illustrating procedures of connecting the immersion liquid holders 51.

FIG. 11 illustrates a situation before the immersion liquid holders 51 are connected to the detection optical system 1, and the connection unit 52 that is in a dissolved state and the supporting members 53 are illustrated. FIG. 12 is a flowchart illustrating procedures of connecting the immersion liquid holders 51 so as to change the situation illustrated in FIG. 11 to the situation illustrated in FIG. 10. Hereinafter, the flowchart of FIG. 12 will be explained.

In step S41, the absorption member 3 absorbs an immersion liquid.

In step S42, the supporting members 53 support the absorption member 3 that has absorbed an immersion liquid.

In step S43, the connection unit 52 connects the supporting members 53 to the detection optical system 1 so as to fix it.

Note that methods of connecting the immersion liquid holders 51 so as to change the situation illustrated in FIG. 11 to the situation illustrated in FIG. 10 are not restricted to the procedures of FIG. 12. For example, the order of step S41 and step S42 is not limited to the above described one, and a configuration may also be employed in which an immersion liquid is sprayed and adhered between the supporting members, which are films, before it is absorbed by the absorption member 3 and the absorption member 3 thereafter absorbs the immersion liquid. When the supporting members 53 themselves, which are flexible films, have an elastic force, the procedures of connecting the immersion liquid holders 51 may be performed in this order. In other words, the immersion liquid holders 51 may have the absorption member 3 that has not absorbed an immersion liquid in advance.

As described above, according to the observation device 50 of the present embodiment, because the immersion liquid holders 51 are configured of films (supporting members 53) having an elastic force and the connection unit 52, which is of an elastic material, the immersion liquid holders 51 are not only detachable but also expand and contract in accordance with the size of the objective (the detection optical system 1). This leads to an advantage wherein an observation can easily be conducted without the necessity of changing the immersion liquid holders 51 in accordance with the size of the objective even when the observation is conducted while switching between different objectives (the detection optical systems 1). Also, because the absorption member 3 is not formed for each sample S differently from the variation example of the second embodiment, it is made possible to promptly respond to observations of different samples S.

Also, the supporting members 53, which are films, and the connection unit 52 may be replaced with other films, O-rings, etc., or may be disposed of for each use.

Figure 13:
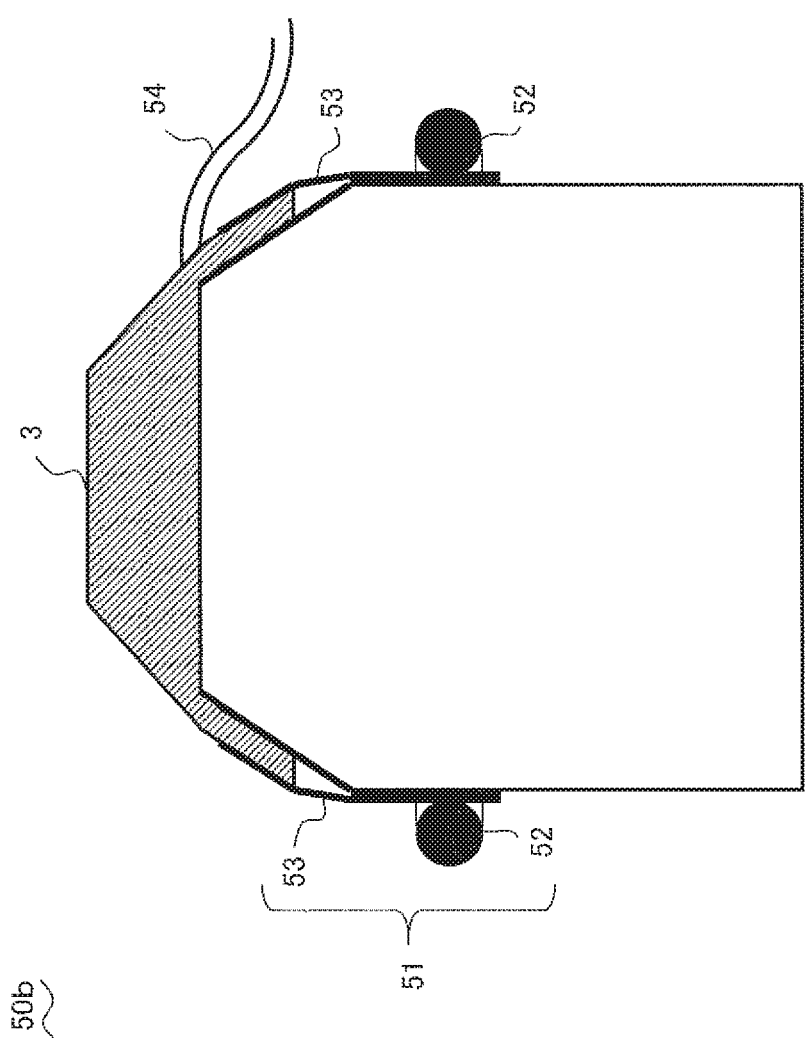
FIG. 13 illustrates part of a configuration of an observation device that is a variation example of the observation device according to the fifth embodiment.

FIG. 13 illustrates part of a configuration of an observation device 50b, which is a variation example of the observation device 50 in the fifth embodiment. The observation device 50b has a pipe 54 that additionally supplies an immersion liquid to the absorption member 3. The pipe 54 supplies, to the observation device 50b, an immersion liquid from a not-illustrated immersion liquid supplying mechanism (and a constituent equivalent to the immersion liquid supplying mechanism 41 of the observation device 40).

As described above, the observation device 50b may have a configuration of supplying, to the absorption member 3 via the pipe 54, additional immersion liquid from an immersion liquid supplying mechanism that is equivalent to the immersion liquid supplying mechanism 41 included in the observation device 40 of the fourth embodiment. The addition of this configuration permits the continuous supply of immersion liquid to the absorption member 3, making it possible to observe sample S for a long period of time even when the evaporation of the immersion liquid from the absorption member 3 is taken into consideration.

Figure 14:
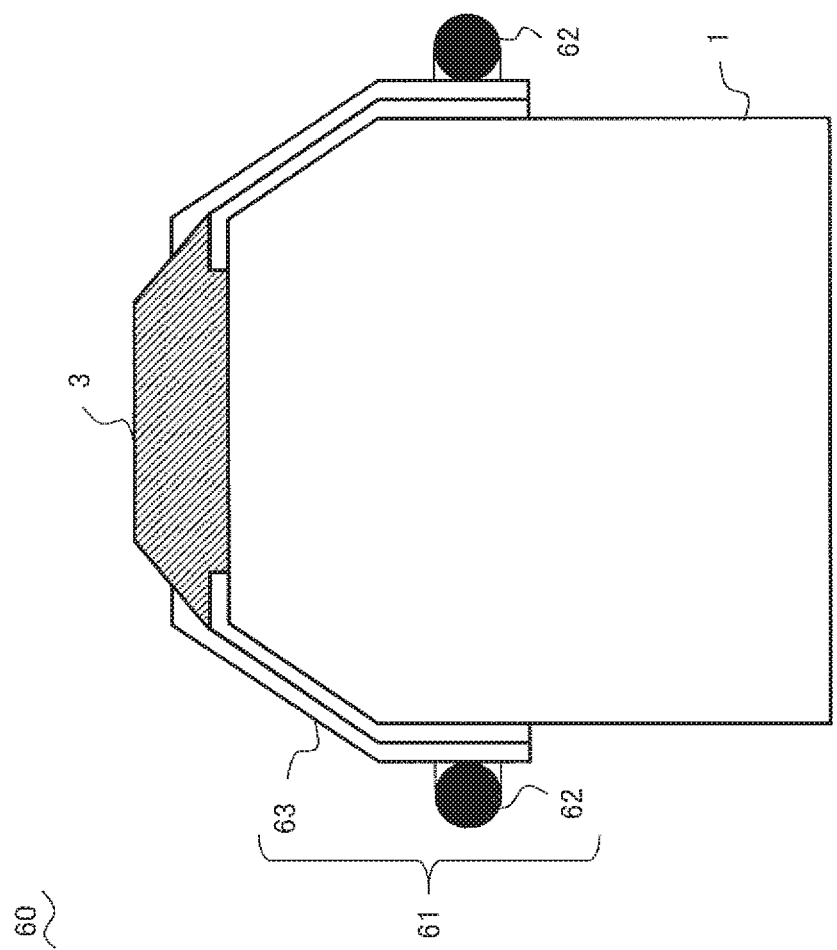
FIG. 14 illustrates part of a configuration of an observation device according to the sixth embodiment.

FIG. 14 illustrates part of a configuration of an observation device 60 according to the sixth embodiment. The observation device 60 is different from the observation device 10 in that it includes immersion liquid holders 61 instead of the immersion liquid holders 2.

The immersion liquid holders 61 have a connection unit 62 and supporting members 63. The connection unit 62 connects the supporting members 63 to the detection optical system 1, and are identical to the connection unit 52 included in the observation device 50. The connection unit 62 is for example an elastic material such as an O-ring.

The supporting members 63 have similar functions to that of the supporting members 53 included in the observation device 50 in that they support the absorption member 3 by sandwiching the absorption member 3 that has absorbed an immersion liquid. The supporting members 63 are formed of molded plastics. The supporting members 63 that have been formed in accordance with the type of the objective that is to be used, i.e., in accordance with the outer contours of the objective that is to be used, are used.

Note that the supporting members 63 may be designed to surround the outer contours of objectives or may be for supporting the absorption member 3 in several directions of the outer contours. In other words, the supporting members 63 may support the absorption member 3 at two or more points or may sandwich and support the absorption member 3 on its circumference.

Figure 15:
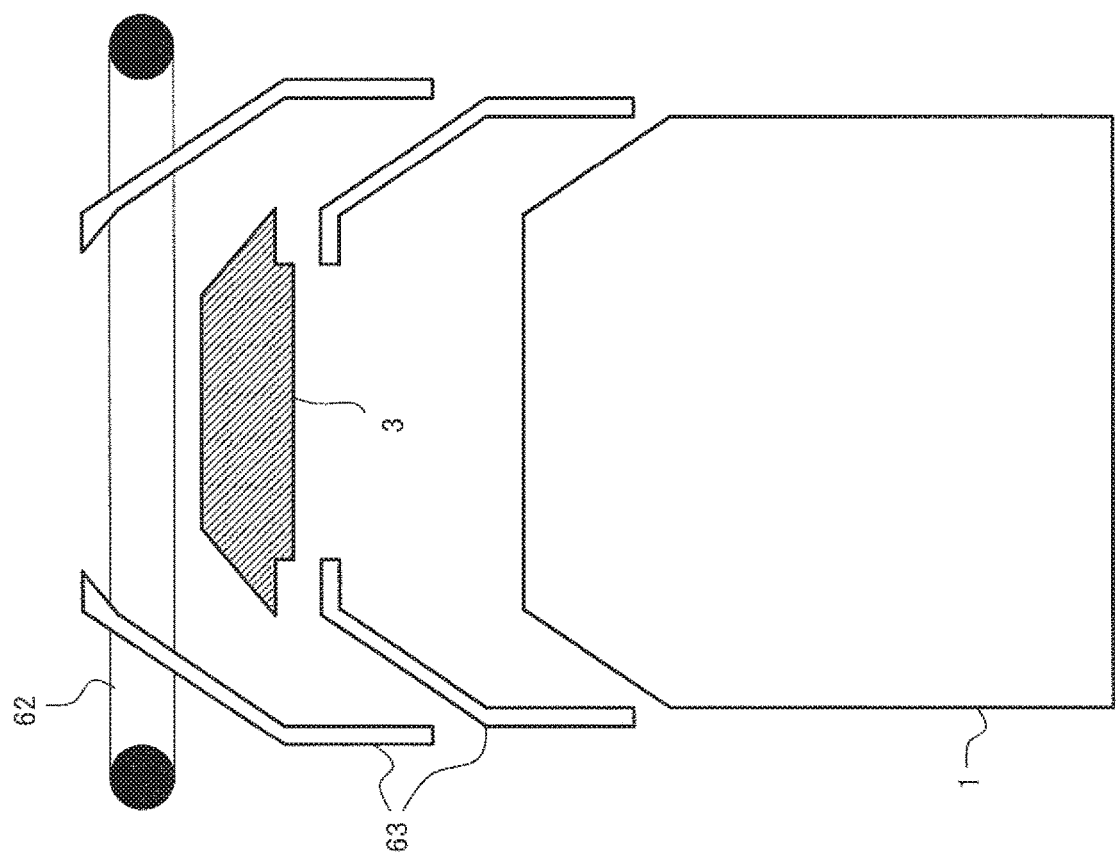
FIG. 15 illustrates a situation before immersion liquid holders are connected to a detection optical system.

FIG. 15 illustrates a situation before the immersion liquid holders 61 are connected to the detection optical system 1, and the connection unit 62 in a dissolved state and the supporting members 63 are illustrated. The procedure of connecting the immersion liquid holders 61 so as to change the situation illustrated in FIG. 15 to the situation illustrated in FIG. 14 is identical to that explained in FIG. 12 for the observation device 50 in the fifth embodiment.

As described above, the observation device 60 of the present embodiment as well makes it possible to use the immersion liquid holders 61 as detachable devices. In particular, the supporting members 63 are formed to a shape in accordance with the objective that is to be used. In other words, the immersion liquid holders 61 having the supporting members 63 in accordance with the type of the objective (the detection optical system 1) that is to be used are prepared in advance. Also, the connection unit 62 may be replaced with other O-rings, and may be disposed of for each usage.

Figure 16:
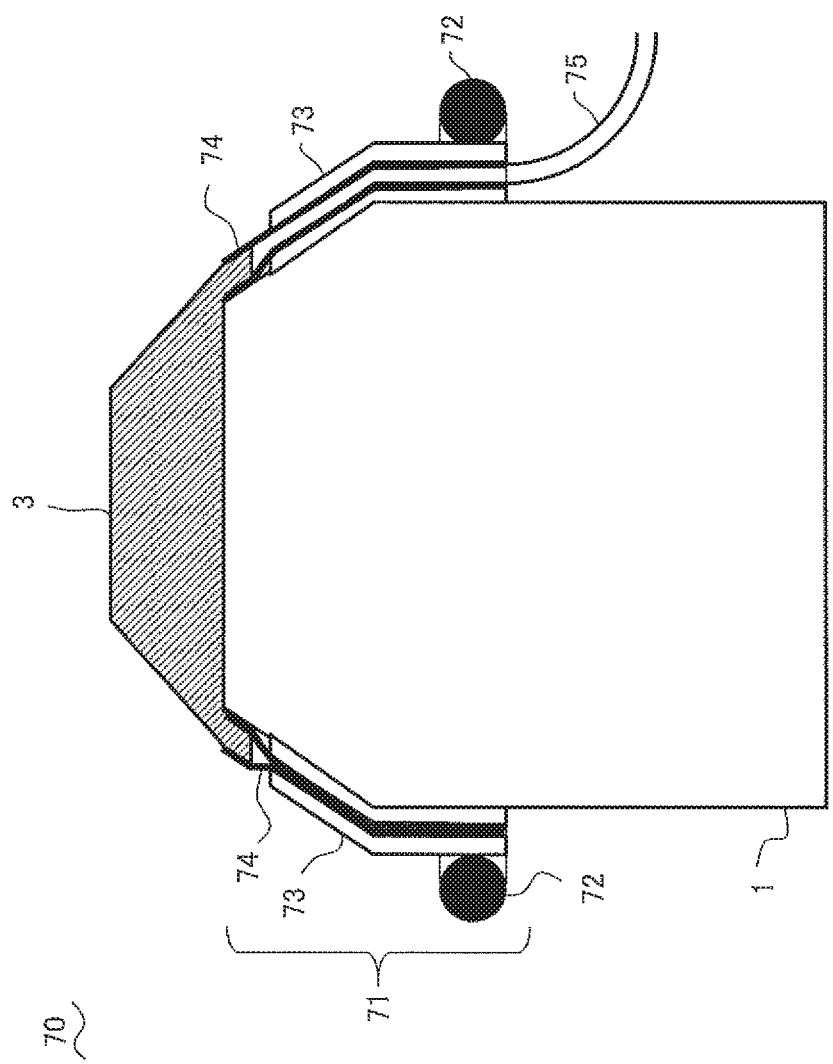
FIG. 16 illustrates part of a configuration of an observation device according to the seventh embodiment.

FIG. 16 illustrates part of a configuration of an observation device 70 according to the seventh embodiment. The observation device 70 is different from the observation device 10 in that it includes immersion liquid holders 71 instead of the immersion liquid holders 2.

The immersion liquid holders 71 include a connection unit 72, first supporting members 73 and second supporting members 74. The connection unit 72 is identical to the connection units 52 and 62 respectively of the fifth and sixth embodiments.

The supporting members 73 are formed of molded plastics and are of a similar material to that of the supporting member 63 of the sixth embodiment. The second supporting members 74 are flexible films, and are of a similar material to that of the supporting member 53 of the fifth embodiment.

Figure 17:
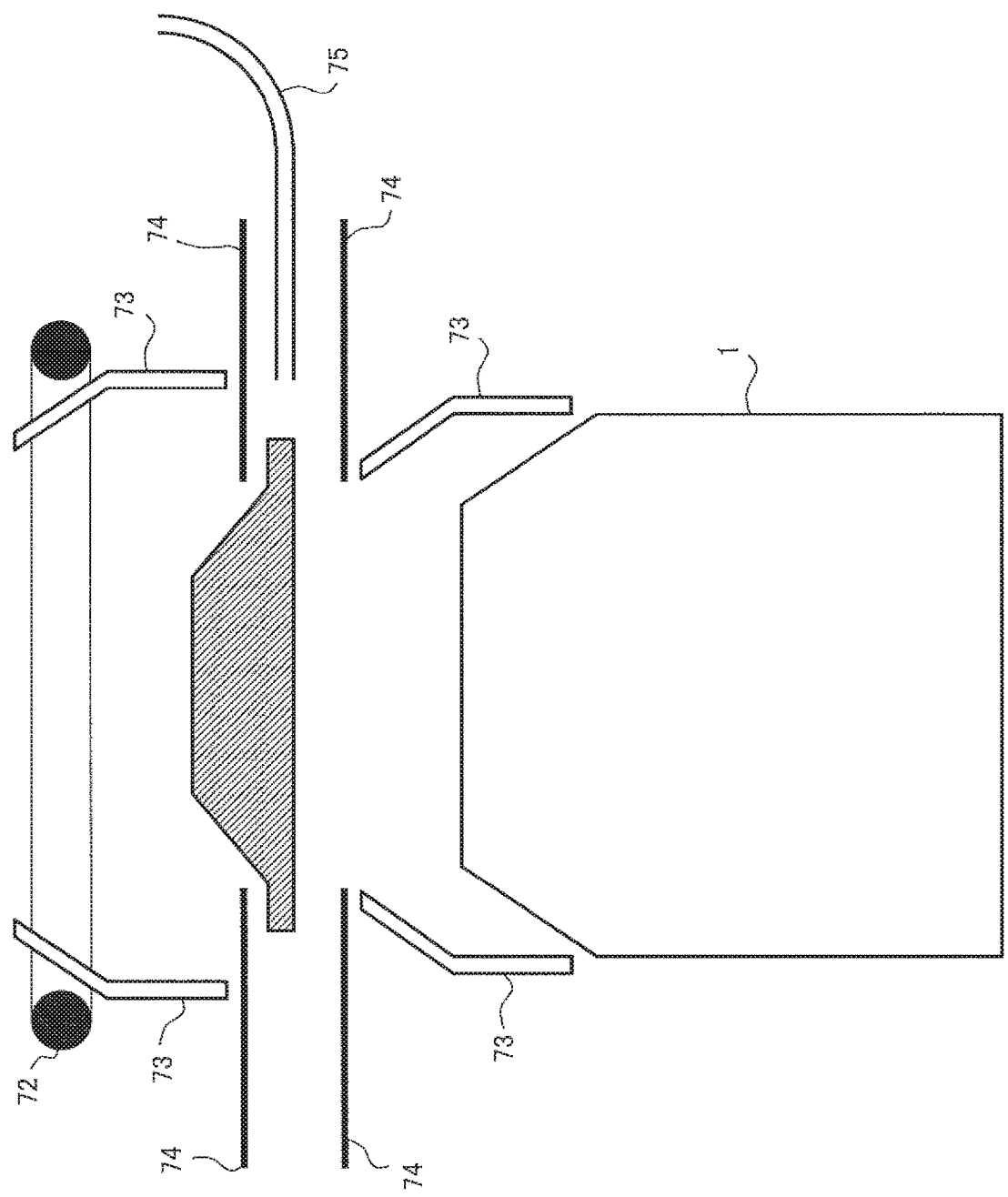
FIG. 17 illustrates a situation before immersion liquid holders are connected to a detection optical system.

FIG. 17 illustrates a situation before the immersion liquid holders 71 are connected to the detection optical system 1, and the connection unit 72 in a dissolved state and the first and second supporting members 73 and 74 are illustrated. In the present embodiment, as illustrated in FIG. 17, the second supporting members 74, which are films, sandwich the absorption member 3 first, and the first supporting members 73 further sandwich the second supporting members 74 from the outside. Then, they are connected to the detection optical system 1 by the connection unit 72, which is an O-ring.

Also, as illustrated in FIG. 17, a second supporting member 74 may then sandwich not only the absorption member 3 but also a pipe 75 together with the absorption member 3. This makes it possible to continuously supply immersion liquid from the immersion liquid supplying mechanism 41 illustrated in the fourth embodiment to the absorption member 3 via the pipe 75.

As described above, the observation device 70 of the present embodiment as well makes it possible to use the immersion liquid holders 71 as detachable devices. As described above, it is also possible to fix the absorption member 3 by using both the first supporting members 73, which are films, and the second supporting members 74, which are formed of molded plastics. Also, the connection unit 72 and the supporting members 74 may be replaced with other O-rings and films or may be disposed of for each usage.

Using a plurality of supporting members at one time as described above can realize connections between immersion liquid holders and the detection optical system 1 that are stronger than in a case where films alone are used. This also makes it possible to conduct an observation with an object sandwiched between them such as the pipe 75 for supplying immersion liquid sandwiched.

Figure 18:
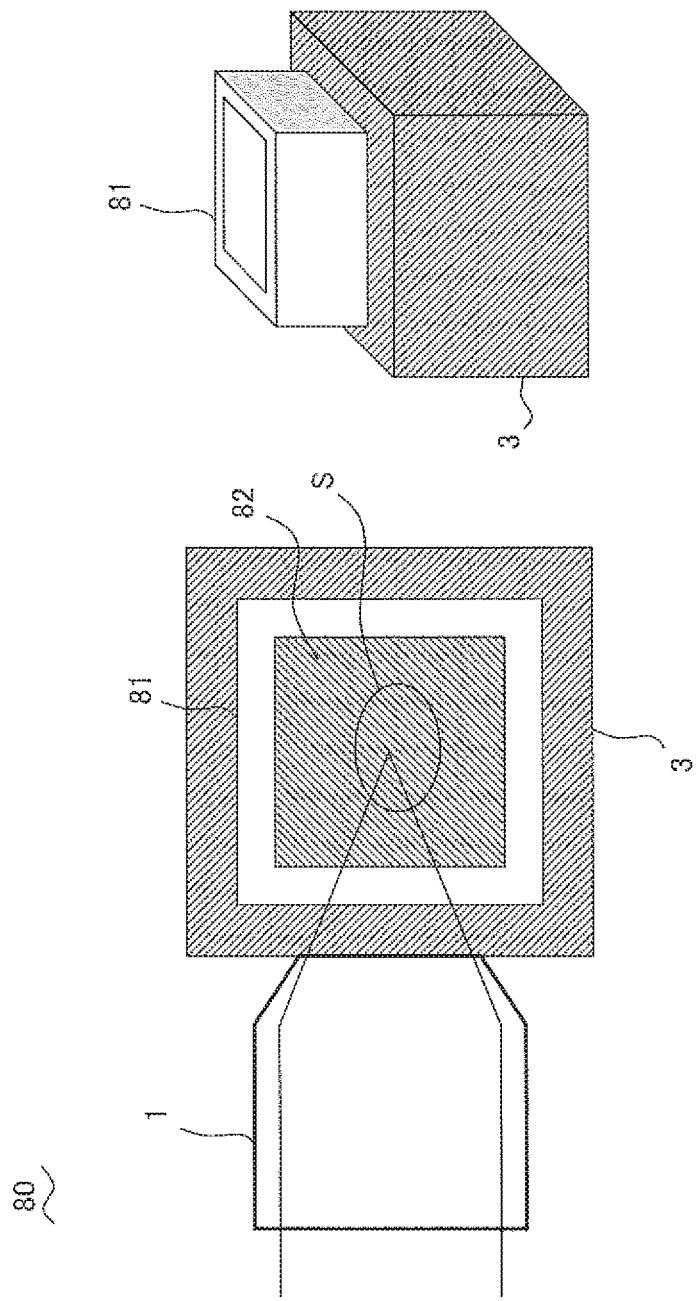
FIG. 18 illustrates part of a configuration of an observation device according to the eighth embodiment.
Figure 19:
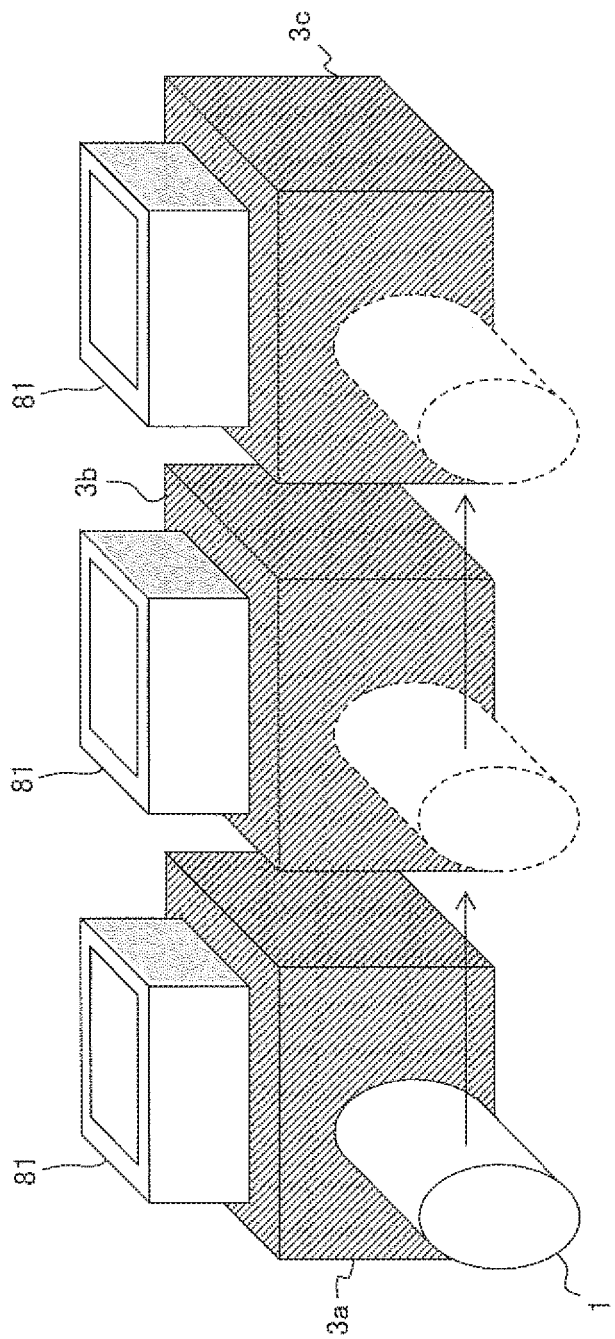
FIG. 19 also illustrates part of a configuration of an observation device according to the eighth embodiment.

FIG. 18 illustrates part of a configuration of an observation device 80 according to the eighth embodiment. In the variation example of the second embodiment explained in FIG. 5, explanations were given for a case where the absorption member 3 is arranged and fixed so as to cover the outside of sample S; however it is possible to employ a configuration in which the absorption member 3 is arranged to cover the outside of a sample container 81 containing sample S and a culture fluid 82. Note that the observation method for the observation device 80 is similar to the procedures explained by using the flowcharts of FIG. 6 and FIG. 7 in the variation example of the second embodiment. Also, the type of the sample container 81 that is to be used is not limited particularly. The sample container 81 may be for example a multiwell plate.

The above configuration makes it possible to sequentially observe a plurality of different samples S by preparing in advance, for a plurality of sample containers 81, the absorption member 3a, the absorption member 3b and the absorption member 3c that have absorbed immersion liquids that are in accordance with the culture fluids and samples S in the respective sample containers 81. More specifically, by switching between the sample containers 81 that are covered by the respective absorption members provided on the optical path of the detection optical system 1, a plurality of different samples can be observed sequentially. The configuration of the observation device 80 can improve the efficiency in an observation of a plurality of samples.

Also, even when the detection optical system 1 (objective) itself is to be changed in accordance with the refractive index of sample S, because constituents belonging to an objective etc. such as an immersion liquid holder are not included, troublesome operations do not have to be conducted even when switching the detection optical system 1 (objective) with another one.

Figure 20:
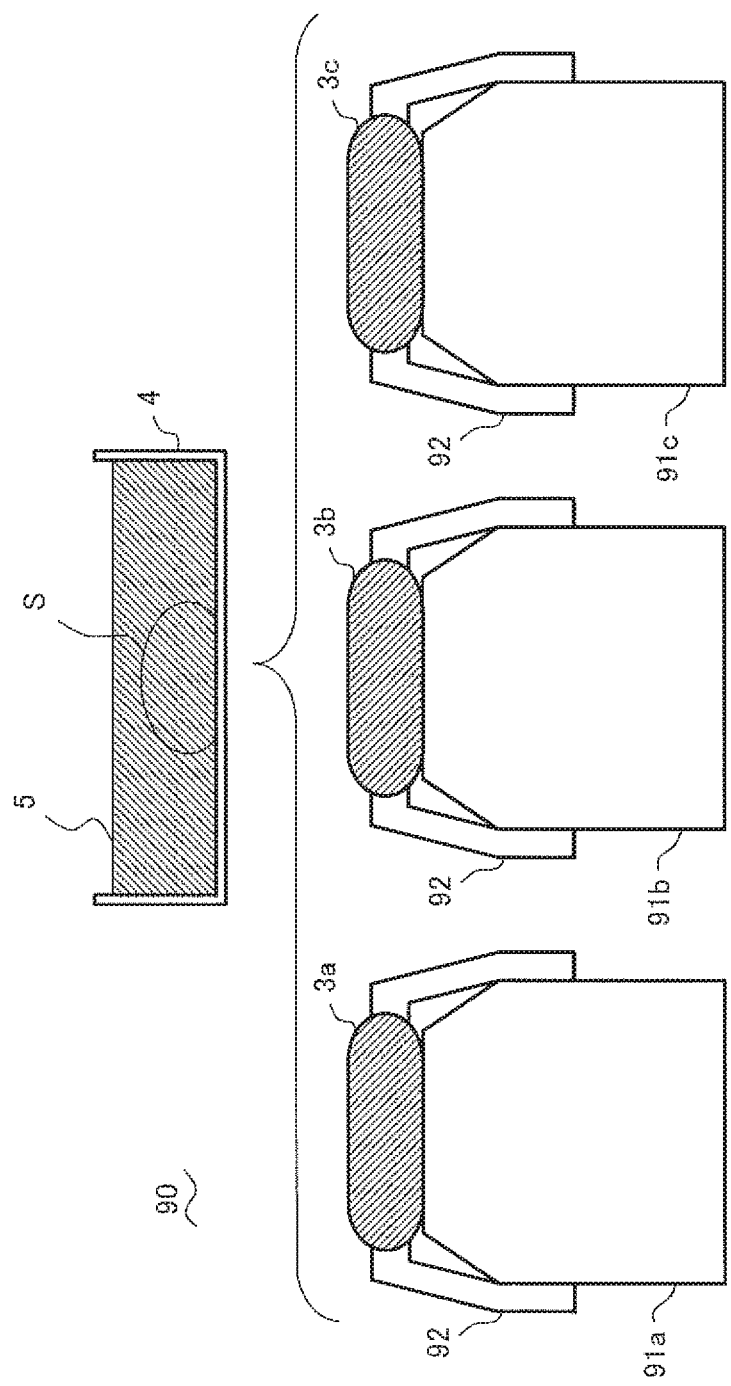
FIG. 20 illustrates part of a configuration of an observation device according to the ninth embodiment.

FIG. 20 illustrates part of a configuration of an observation device 90 according to the ninth embodiment. In the present embodiment, immersion liquid holders 92 are connected so as to fix the absorption members 3a through 3c that respectively have absorbed different immersion liquids in a plurality of optical systems 91a through 91c. The immersion liquid holders 92 have a similar configuration to that of the immersion liquid holder 2 explained in the first embodiment.

In this configuration, an immersion liquid appropriate for each detection optical system is fixed in advance. Accordingly, just selecting an appropriate detection optical system (immersion liquid) in accordance with the refractive index of sample S (including a culture fluid etc.) that has been set permits a satisfactory observation. In the present embodiment particularly, it is only necessary to switch the detection optical system to which the absorption member 3 is fixed in advance and it is not necessary to conduct troublesome operations of mounting/removing the immersion liquid holder 92 or forming (spraying) the absorption member 3 for each sample S during observations, making it possible to improve the efficiency in observations.

Figure 21:
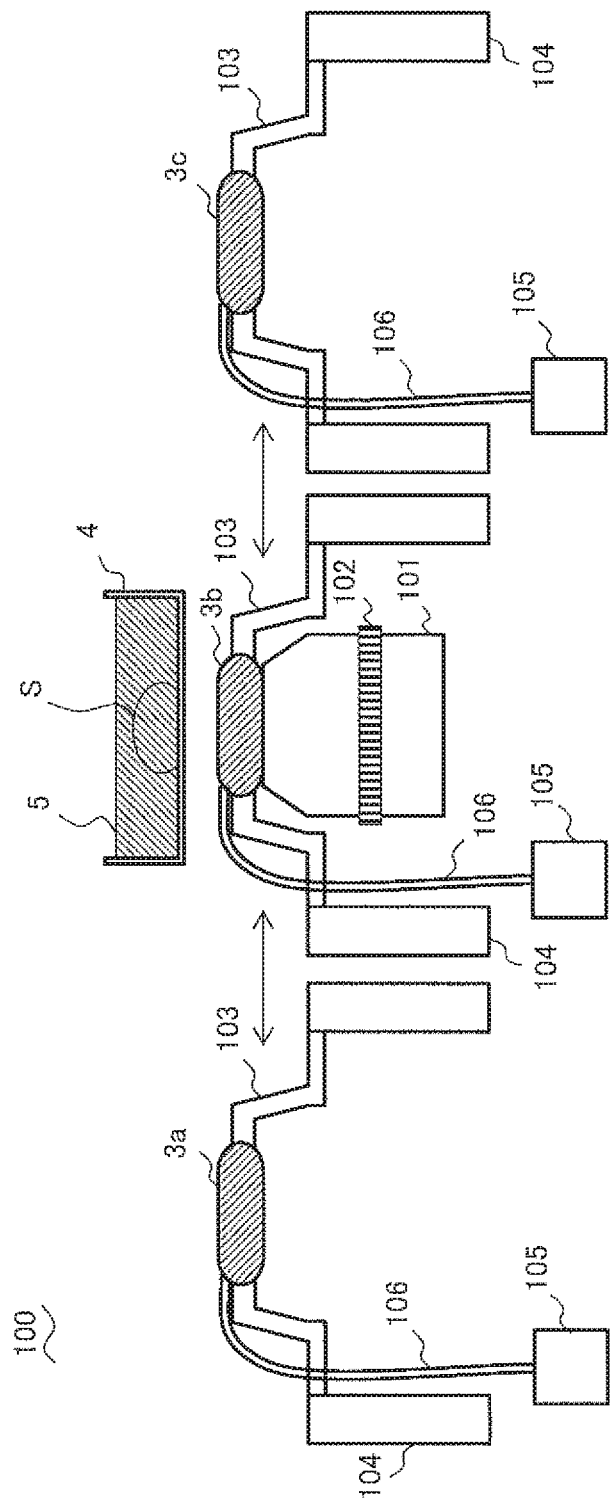
FIG. 21 illustrates part of a configuration of an observation device according to the tenth embodiment.

FIG. 21 illustrates part of a configuration of an observation device 100 according to the tenth embodiment. In the present embodiment, one detection optical system 101 and immersion liquid holders 103 that fix the absorption members 3a through 3b that respectively have absorbed different immersion liquids are connected to a microscope body 104. The immersion liquid holders 103 have a similar configuration to that of the immersion liquid holder 2 explained in the variation example of the first embodiment.

Also, the detection optical system 101 has a correction collar 102. The observer adjusts the correction collar 102 to resolve a spherical aberration occurring in the detection optical system 101.

For example, when a plurality of immersion liquids having greatly different refractive indexes are used, the detection optical system 101 may be provided with a correction collar as in the present embodiment. Instead of switching and using a detection optical system (objective) between a plurality of detection optical systems (objectives) for each absorption member as in the ninth embodiment, it is also possible to respond to an observation in which a plurality of samples Shaving greatly different refractive indexes are used because one objective is provided with a correction collar.

Also, as illustrated in FIG. 21, because the observation device 90 is provided with an immersion liquid supplying mechanism 105 and a pipe 106 for supplying an immersion liquid to each absorption member, an immersion liquid is supplied continuously and it is possible to observe sample S for a long period of time even when the evaporation of the immersion liquid from absorption members is taken into consideration.

Figure 22:
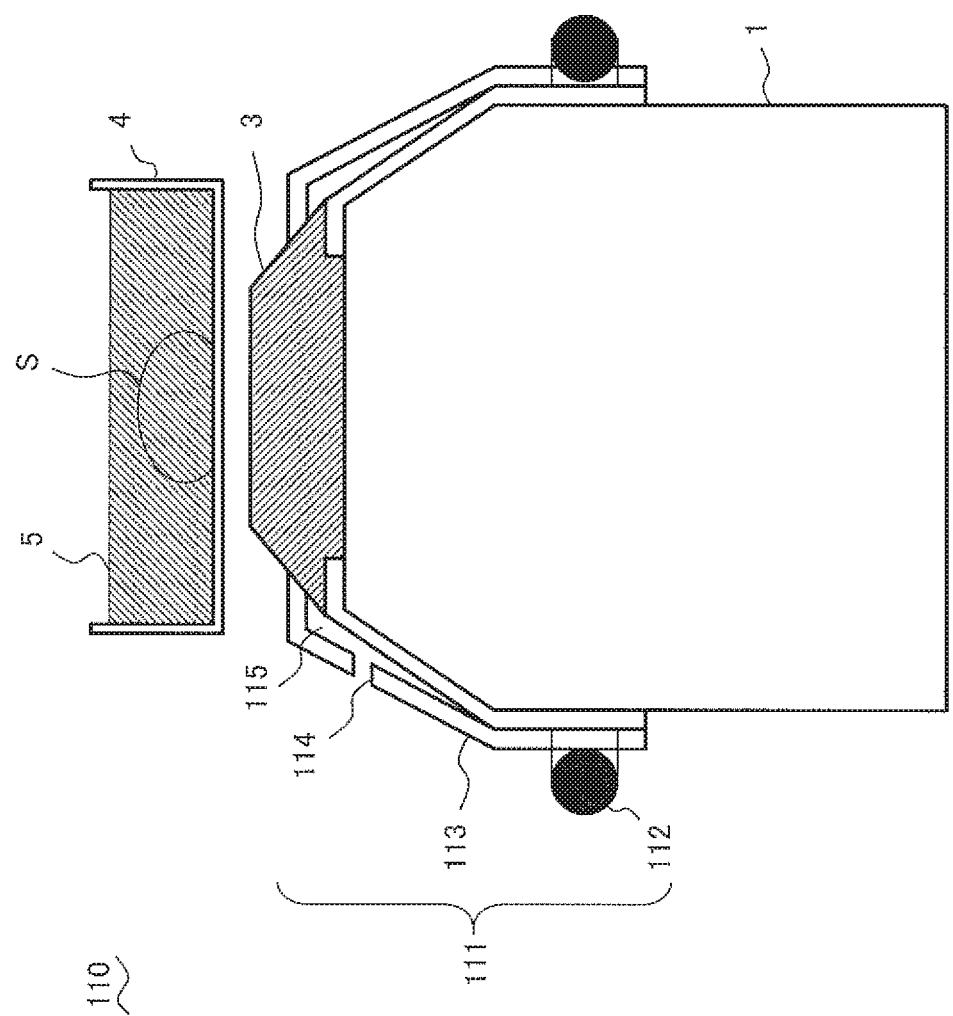
FIG. 22 illustrates part of a configuration of an observation device according to the eleventh embodiment.

FIG. 22 illustrates part of a configuration of an observation device 110 in the eleventh embodiment. The observation device 110 is different from the observation device 10 of the first embodiment in that it includes immersion liquid holders 111 instead of the immersion liquid holders 2.

The immersion liquid holders 111 include a connection unit 112 and supporting members 113. The connection unit 112 is identical to the connection units 52, 62 and 72 in the fifth through seventh embodiments.

The supporting members 113 are formed of molded plastics, and are of a similar material to that of the supporting member 63 of the sixth embodiment. The supporting members 113 sandwich and support the absorption member 3. In this example, similarly to the sixth embodiment, the supporting members 113 may support the absorption member 3 at two or more points or may sandwich and support the absorption member 3 on its circumference.

When the supporting members 113 support the absorption member 3 and are fixed to the observation device 110 by the connection unit 112, a space 115 capable of accommodating the absorption member 3 that can be deformed by the elastic force may be formed between the supporting members 113 and the detection optical system 1. More specifically, the space 115 is formed in a region between the supporting members 113 that sandwich the absorption member 3.

The space 115 is formed in the supporting members 113 when the supporting members 113 sandwich the absorption member 3 as illustrated in FIG. 22, and the absorption member 3 that has been deformed due to the elastic force may enter and leave the space 115. More specifically, when the volume of the absorption member 3 that has absorbed an immersion liquid increases in the supporting members 113 of the immersion liquid holders 111 due to the deformation caused by the elastic force, a volume equivalent to the increase in the absorption member 3 can be accommodated.

Figure 23:
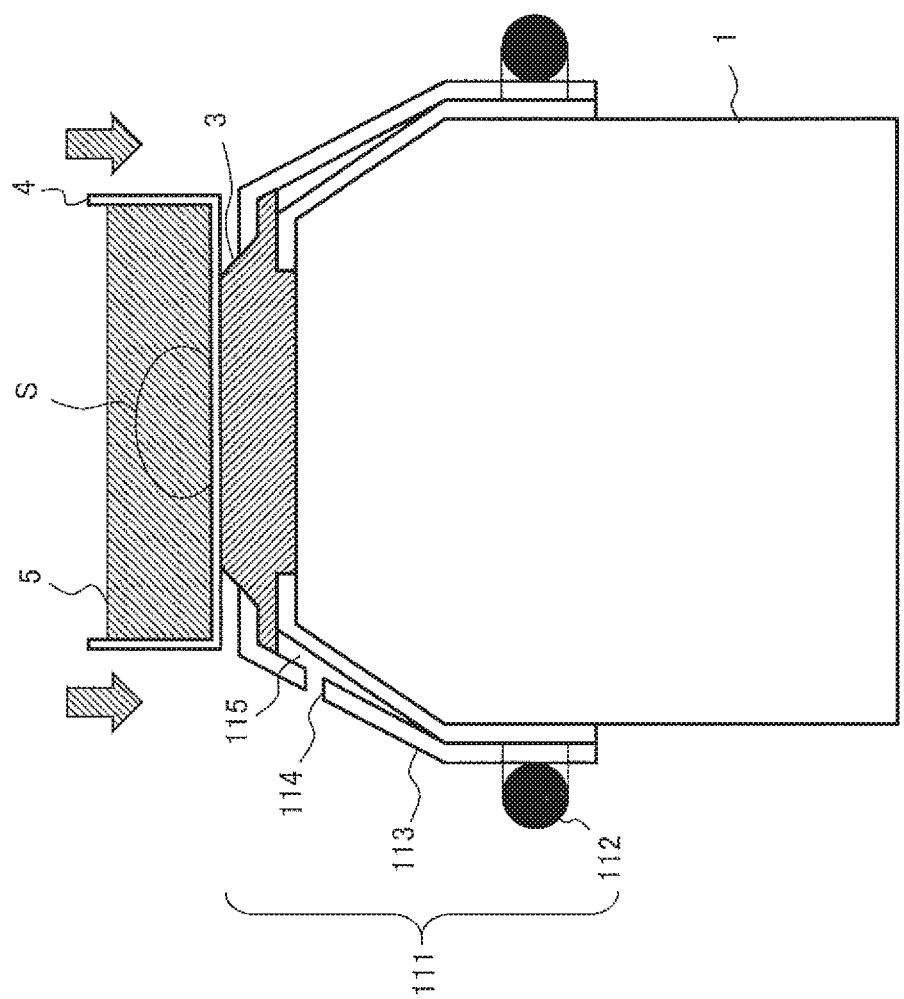
FIG. 23 also illustrates part of a configuration of an observation device according to the eleventh embodiment.

For example, when a change in the operation distance of the detection optical system 1 makes a distance shorter between the detection optical system 1 and sample S as illustrated in FIG. 23, the absorption member 3 is pressed between the sample container 4 and the detection optical system 1. The absorption member 3 that has absorbed an immersion liquid expands in the space 115 due to the pressure.

As described above, the formation of the space 115 in the supporting members 113 facilitates the deformation of the absorption member 3 in a case when the absorption member 3 is deformed, particularly when the absorption member 3 expands in the supporting members 113 of the immersion liquid holders 111 in a situation in which the absorption member 3 is pressed. In other words, it is possible to facilitate the deformation of the absorption member 3 set between sample S and the detection optical system 1 when changing the operation distance of the detection optical system 1.

Also, the space 115 is formed in a region in the supporting members 113 that sandwich the absorption member 3. Because of this, even when a portion of the absorption member 3 enters the space 115, the sandwiched state is maintained, thereby preventing a situation in which the absorption member 3 is released from the supporting structure included in the supporting members 113 and leaves the state of being supported.

Also, it is desirable that the supporting members 113 have an opening 114 that provides communications between the space 115 and the outside of immersion liquid holders 111, when the space 115 in which the supporting members 113 sandwich and support the absorption member 3 on its circumference is in a nearly-sealed state. Air going in and out through this opening 114 makes it easier for the absorption member 3 to be moved through the space 115 by the pressure.

As described above, the observation device 110 of the eleventh embodiment realizes smooth deformation of the absorption member 3 in a case when a change in the operation distance of the detection optical system 1 etc. causes a change in the distance between sample S and the detection optical system 1.

In the above respective embodiments, the absorption member 3 is adjusted as described above in a stage of absorbing immersion liquid so that it has a shape in accordance with the shapes of the sample container, the sample, and the detection optical system that are used. FIG. 24 illustrates examples of shapes that can be employed by the absorption member 3 that has absorbed an immersion liquid.

Shape A is a shape that spreads into a form of a sheet, and is easy to generate. Shape B is a shape generated on an assumption that part of the absorption member 3 is sandwiched and fixed with the immersion liquid holder 51 etc. in the fifth embodiment. Shape C is a shape generated in accordance with the outer contours of the detection optical system (objective) that is to be used. Shape C can fix the absorption member 3 by covering the detection optical system, leading to a high stability.

Shape D has a convex plane at the portion in contact with samples, resulting in elastic deformation after causing a point contact when brought into contact with a plane such as the container 4 and resulting in less likelihood that bubbles will be involved. Shape E illustrates a bag-like state in which an absorption member contains, in a sealing manner, an immersion liquid that has not been absorbed. According to shape E, by continuously absorbing the inside immersion liquid, a state in which an immersion liquid is absorbed can be maintained for a long period of time even when the evaporation of the immersion liquid from an absorption member is taken into consideration.

Also, it may be a shape in which the top portion of shape B has a concave plane like shape F. Further, if it is spherical like shape G, it can be generated easily. As the shape of an absorption member, an arbitrary shape can be generated in accordance with a sample container etc.

As described above, according to the present invention, it is possible to maintain an immersion liquid satisfactorily and to easily conduct an observation in accordance with the types of samples and observation depths.

The above embodiments are specific examples for facilitating understanding of the invention and the scope of the present invention is not limited to these embodiments. Various modifications and changes are possible for the above described observation devices, immersion liquid holders and optical systems without departing from the spirit of the present invention, which is described in the claims.

What is claimed is:

1. An immersion liquid holder that is configured to be used for an observation device for observing a sample by using an immersion method, the immersion liquid holder comprising:
   a supporting member configured to support an absorption member that has absorbed an immersion liquid; and
   a connection unit configured to relatively fix the absorption member that has absorbed the immersion liquid with respect to an optical system included in the observation device and to fix the absorption member on an optical path of the optical system, by fixing the supporting member to the observation device.

2. The immersion liquid holder according to claim 1, wherein the absorption member that has absorbed the immersion liquid is an elastic body.

3. The immersion liquid holder according to claim 2, wherein a space is formed between the supporting member and the optical system in a state in which the supporting member is fixed to the observation device by the connection unit, the space being capable of accommodating the absorption member that has absorbed the immersion liquid, and the absorption member that has absorbed the immersion liquid being deformable by an elastic force.

4. The immersion liquid holder according to claim 3, wherein the space and an outside of the supporting member are in communication through the supporting member.

5. The immersion liquid holder according to claim 2, wherein the supporting member is configured to be arranged outside the optical path of the optical system and is configured not to block light traveling through the optical system.

6. The immersion liquid holder according to claim 2, wherein the absorption member that has absorbed the immersion liquid has a shape projecting toward the sample beyond the supporting member when the supporting member supports the absorption member that has absorbed the immersion liquid.

7. The immersion liquid holder according to claim 2, wherein the supporting member is formed by a flexible film having an elastic force.

8. The immersion liquid holder according to claim 2, further comprising:
   an immersion liquid supplying mechanism configured to supply additional immersion liquid to the absorption member that has absorbed the immersion liquid.

9. The immersion liquid holder according to claim 8, wherein the immersion liquid supplying mechanism includes a flexible pipe configured to supply the additional immersion liquid to the absorption member that has absorbed the immersion liquid.

10. The immersion liquid holder according to claim 9, wherein the supporting member supports the pipe.

11. An observation device for observing a sample by using an immersion method, the observation device comprising:
    an optical system; and
    the immersion liquid holder according to claim 2.

12. The observation device according to claim 11, wherein the immersion liquid holder includes the absorption member that has not absorbed the immersion liquid in advance.

\* \* \* \* \*